United States Patent

Sato

[11] Patent Number: 5,841,590
[45] Date of Patent: Nov. 24, 1998

[54] ABERRATION CONTROLLABLE OPTICAL SYSTEM

[75] Inventor: Haruo Sato, Kawaguchi, Japan

[73] Assignee: Nikon Corporation, Tokyo, Japan

[21] Appl. No.: 917,844

[22] Filed: Aug. 27, 1997

[30] Foreign Application Priority Data

Aug. 27, 1996 [JP] Japan .................................. 8-244285
Aug. 27, 1996 [JP] Japan .................................. 8-244286

[51] Int. Cl.$^6$ ...................................................... G02B 9/60
[52] U.S. Cl. .......................... 359/763; 359/764; 359/659
[58] Field of Search .................................. 359/637, 659, 359/763, 764, 766, 675

[56] References Cited

U.S. PATENT DOCUMENTS

| | | | |
|---|---|---|---|
| 4,477,154 | 10/1984 | Sato | 359/764 |
| 4,576,448 | 3/1986 | Ikari | 359/764 |
| 4,792,217 | 12/1988 | Yoshioka | 359/764 |
| 4,900,141 | 2/1990 | Ohishita | 359/764 |
| 5,086,355 | 2/1992 | Kudo et al. | 359/675 |
| 5,357,373 | 10/1994 | Yoshioka et al. | 359/649 |

FOREIGN PATENT DOCUMENTS

| | | | |
|---|---|---|---|
| 52-76921 | 6/1977 | Japan | G02B 9/34 |
| 53-109626 | 9/1978 | Japan | G02B 13/20 |
| H1-259314 | 10/1989 | Japan | G02B 9/62 |

*Primary Examiner*—Loha Ben
*Attorney, Agent, or Firm*—Chapman and Cutler

[57] ABSTRACT

An aberration-controllable optical system has a large angle of view and is capable of continuously varying spherical aberrations from negative values to positive values, including a point at which a sharp image can be produced. A master lens group includes a first sub lens group having a positive refractive power, a second sub lens group having a negative refractive power, and a third sub lens group having a positive refractive power in this order from the object side of the system. The converter lens group includes a positive lens element and a negative lens element in this order from the object side. The on-axis distance of the air gap which is formed between the positive lens element and the negative lens element can be controlled to mainly change the spherical aberrations in this system. When $f_m$ is a master lens group focal length and $f_C$ is a converter lens group focal length, the aberration-controllable optical system satisfies a condition:

$-1 < f_M/f_C < 0$.

The master lens group can include a front group and a rear group. Focusing at a short distance may be conducted by moving the front lens group and the rear group independently of each other.

25 Claims, 18 Drawing Sheets

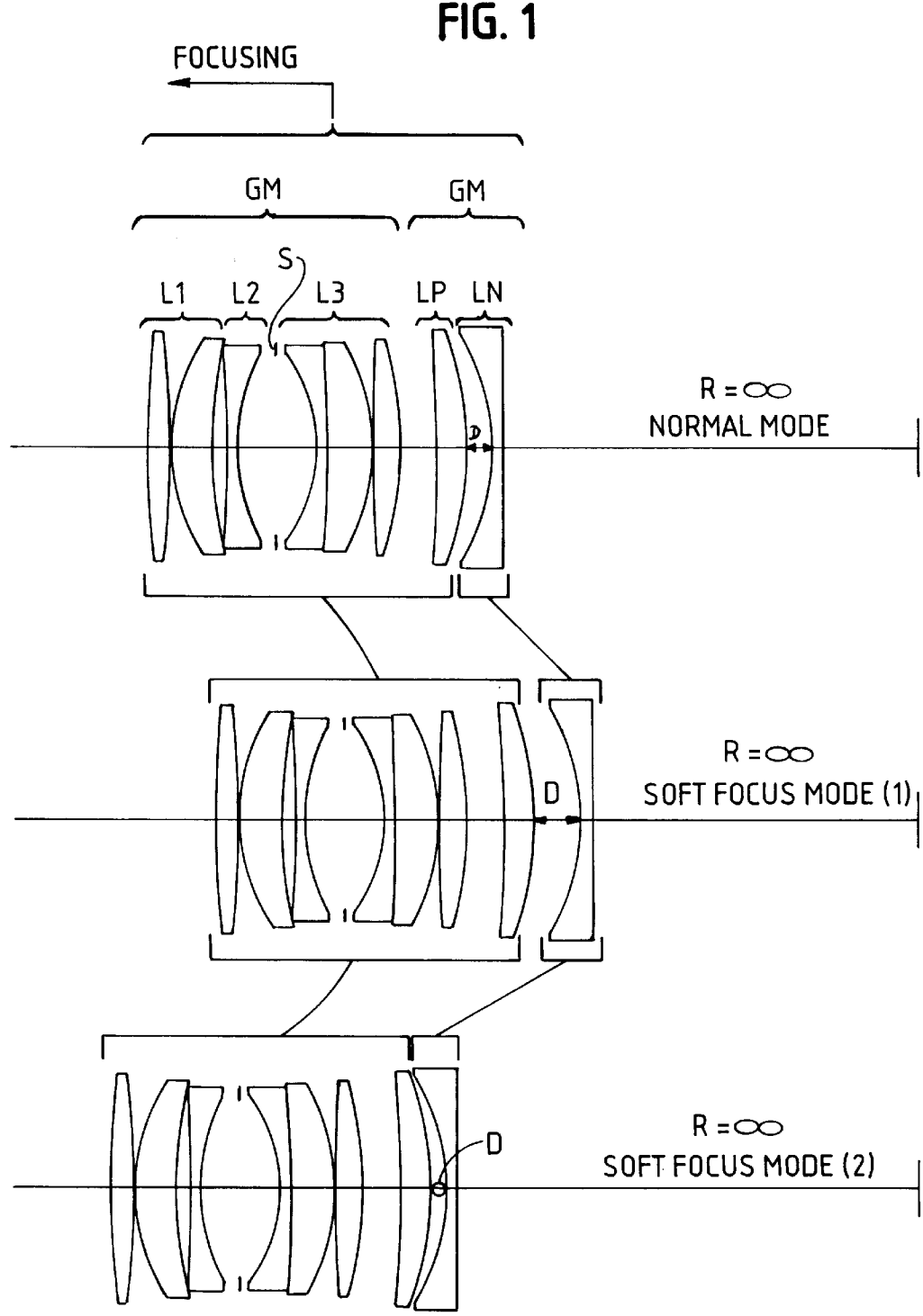

FIG. 2a
FNO = 2.83
d g

SPHERICAL ABERRATION 0.500

ASTIGMATISM 0.500

DISTORTION 2.000%

FIG. 2d
−0.050
LATERAL CHROMATIC ABERRATION
g

FIG. 2i A=0.0 d g
COMA 0.100

FIG. 3a $g_d$ FNO = 2.31

5.000
SPHERICAL ABERRATION

FIG. 3b A = -19.79 $gg_{dd}$ 2.000
ASTIGMATISM

FIG. 3c A = -19.79

2.000%
DISTORTION

FIG. 3d g

-0.050  LATERAL CHROMATIC ABERRATION

FIG. 3i A = 0.0  $d_g$ 0.500
COMA $d_g$

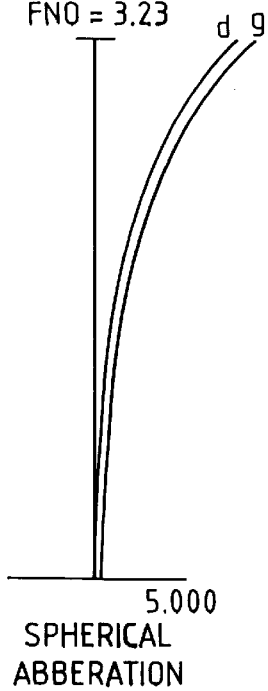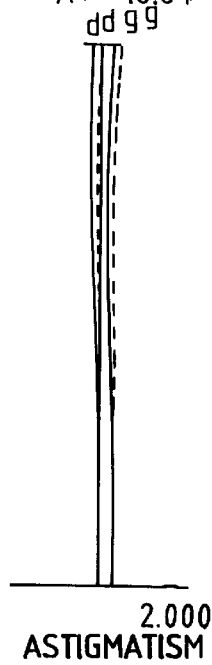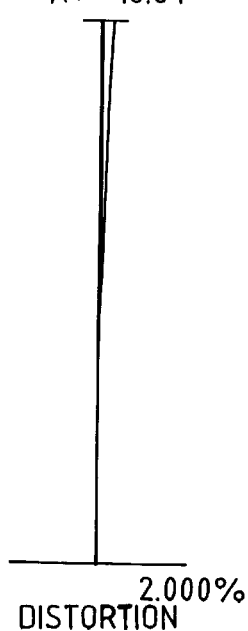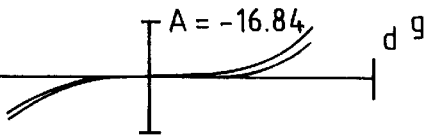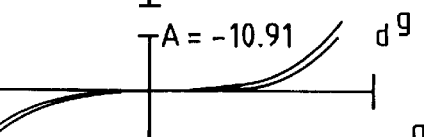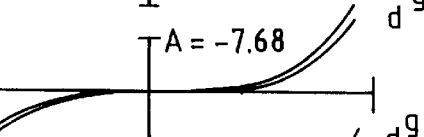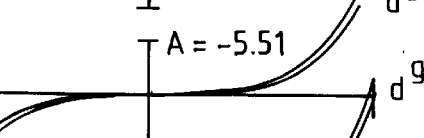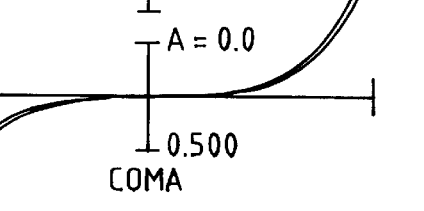

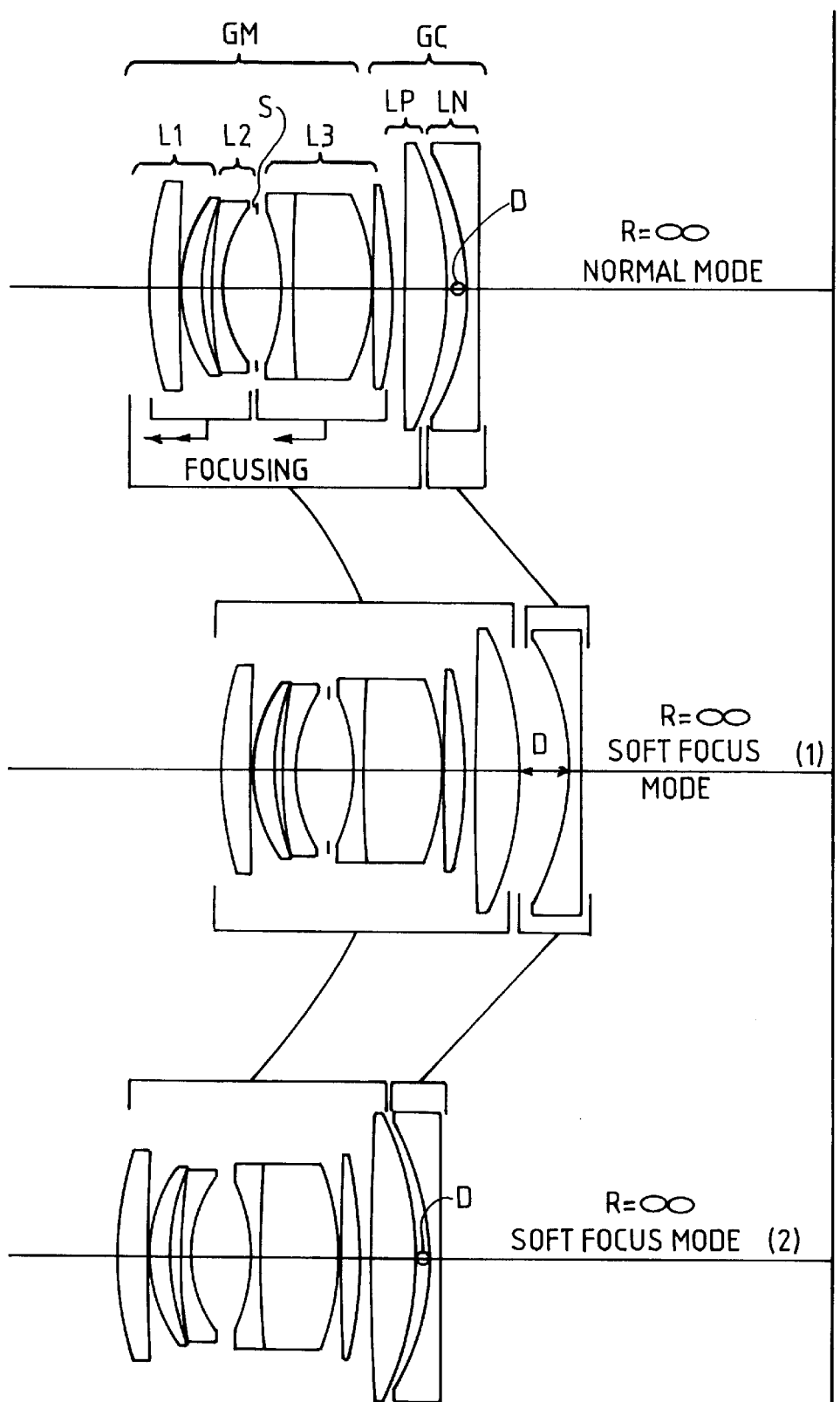

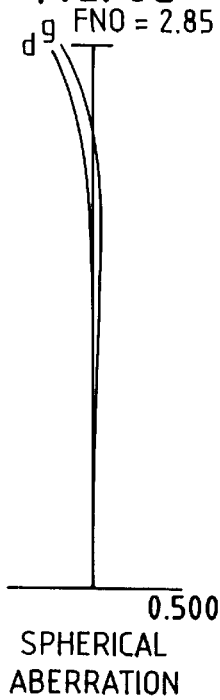
FIG. 6a
FNO = 2.85
d g
0.500
SPHERICAL
ABERRATION
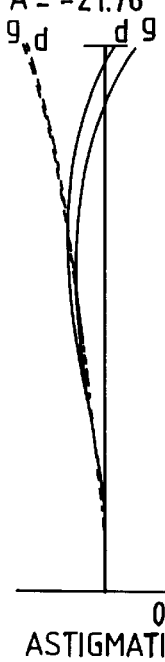
FIG. 6b
A = -21.76
g d   d g
0.500
ASTIGMATISM
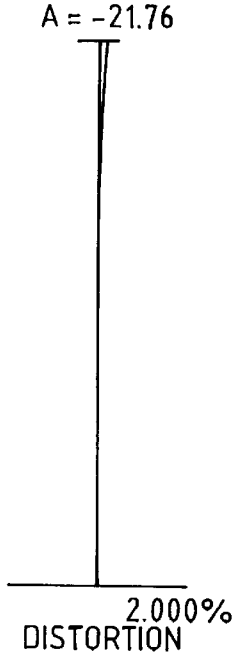
FIG. 6c
A = -21.76
2.000%
DISTORTION
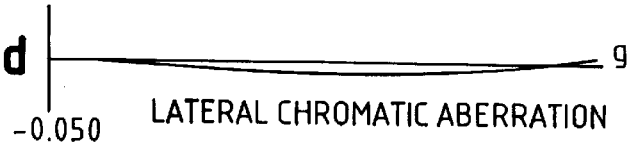
FIG. 6d
-0.050    LATERAL CHROMATIC ABERRATION    g
FIG. 6e    A = -21.76    d g
FIG. 6f    A = -14.25    d g
FIG. 6g    A = -10.07    d g
FIG. 6h    A = -7.24    d g
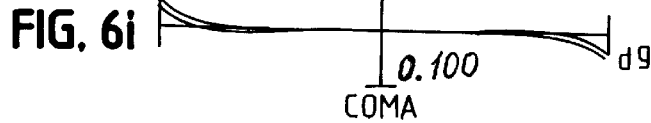
FIG. 6i    A = 0.0
0.100    d g
COMA

FIG. 7a g d FNO = 2.29

4.000
SPHERICAL ABERRATION

FIG. 7b A = −24.92 g d g d 3.000
ASTIGMATISM

FIG. 7c A = −24.92

2.000%
DISTORTION

FIG. 7d
−0.050 LATERAL CHROMATIC ABERRATION g

FIG. 7i A = 0.0
0.500
COMA d g

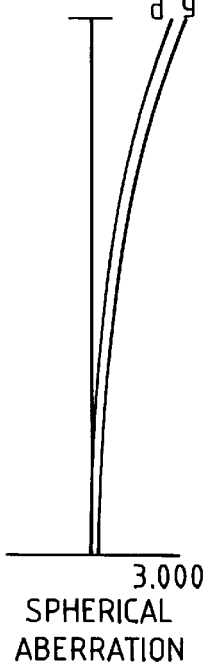
FIG. 8a
FNO = 3.11
3.000
SPHERICAL
ABERRATION
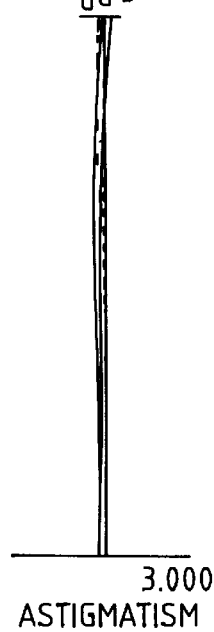
FIG. 8b
A = -20.67
3.000
ASTIGMATISM
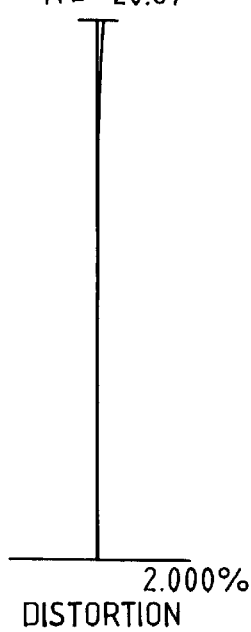
FIG. 8c
A = -20.67
2.000%
DISTORTION
FIG. 8d
LATERAL CHROMATIC ABERRATION
-0.050
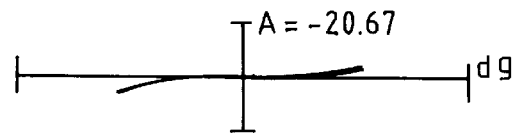
FIG. 8e  A = -20.67
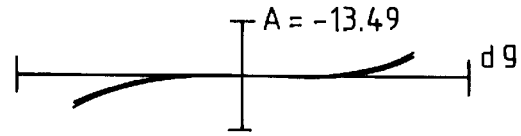
FIG. 8f  A = -13.49
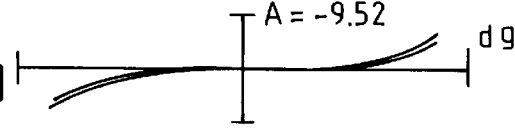
FIG. 8g  A = -9.52
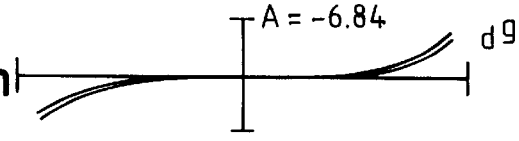
FIG. 8h  A = -6.84
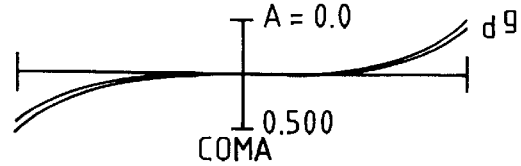
FIG. 8i  A = 0.0
0.500
COMA

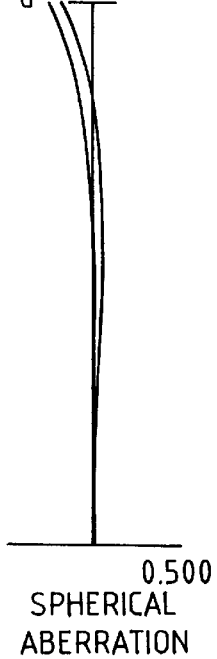

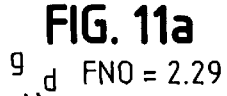
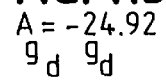
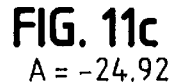

FNO = 3.11

3.000
SPHERICAL ABERRATION

A = -20.67

3.000
ASTIGMATISM

A = -20.67

2.000%
DISTORTION

-0.050
LATERAL CHROMATIC ABERRATION

A = -20.67

A = -13.49

A = -9.52

A = -6.84

A = 0.0

0.500
COMA ABERRATION

FIG. 13a
d g NA = 0.17
0.500
SPHERICAL ABERRATION
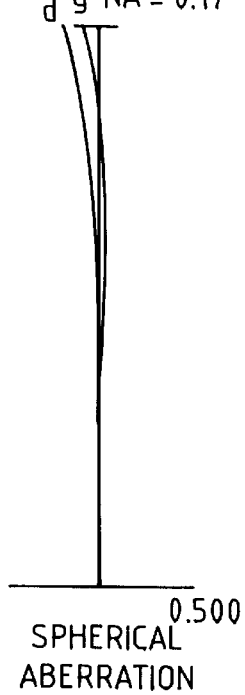
FIG. 13b
HO = -1018.21
d g   d g
0.500
ASTIGMATISM
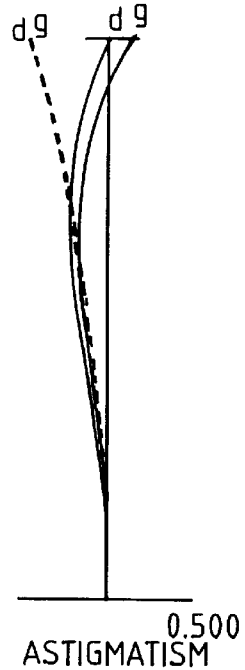
FIG. 13c
HO = -1018.21
2.000%
DISTORTION
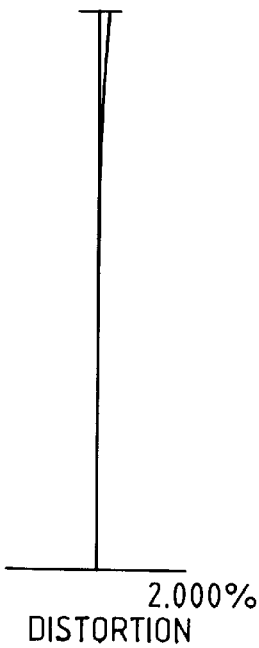
FIG. 13d
-0.050   LATERAL CHROMATIC ABERRATION   g
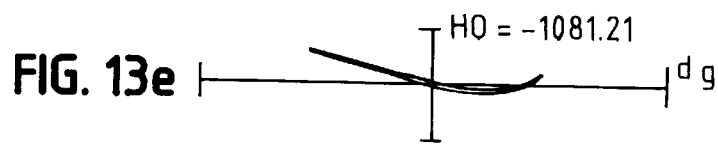
FIG. 13e
HO = -1081.21   d g
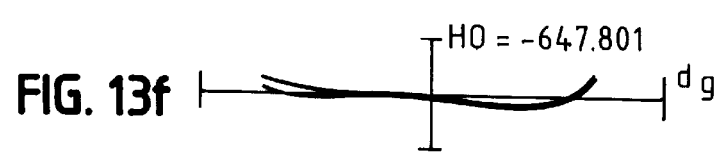
FIG. 13f
HO = -647.801   d g
FIG. 13g
HO = -452.96   d g
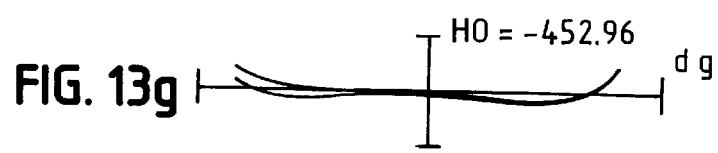
FIG. 13h
HO = -323.99   d g
FIG. 13i
HO = 0.0   d g
0.100
COMA ABERRATION
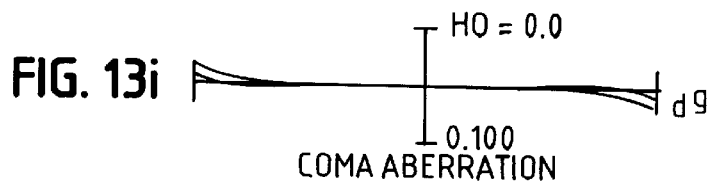

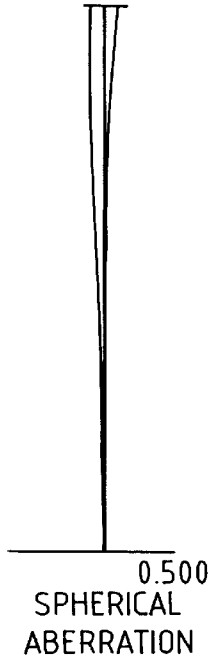
FIG. 14a  NA = 0.16
0.500
SPHERICAL ABERRATION
FIG. 14b  HO = -339.30
0.500
ASTIGMATISM
FIG. 14c  HO = -339.30
2.000%
DISTORTION
FIG. 14d  LATERAL CHROMATIC ABERRATION
-0.050
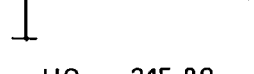
FIG. 14e  HO = -339.30
FIG. 14f  HO = -215.89
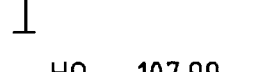
FIG. 14g  HO = -150.97
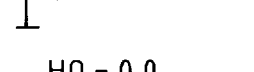
FIG. 14h  HO = -107.99
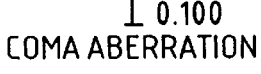
FIG. 14i  HO = 0.0
0.100
COMA ABERRATION

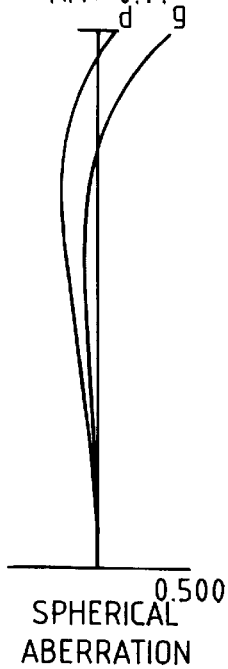
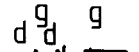
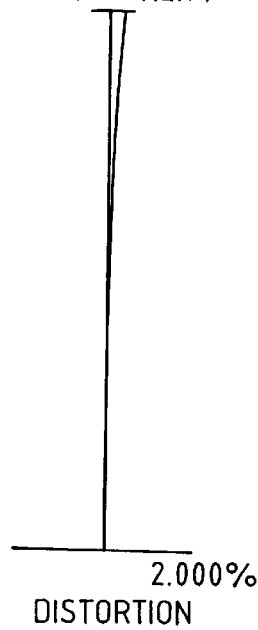
FIG. 15a  NA = 0.14  
SPHERICAL ABERRATION  0.500
FIG. 15b  HO = -112.97  
ASTIGMATISM  0.500
FIG. 15c  HO = -112.97  
DISTORTION  2.000%
FIG. 15d  LATERAL CHROMATIC ABERRATION  -0.050
FIG. 15e  HO = -112.97
FIG. 15f  HO = -71.92
FIG. 15g  HO = -50.31
FIG. 15h  HO = -35.99
FIG. 15i  HO = 0.0
COMA ABERRATION  0.100

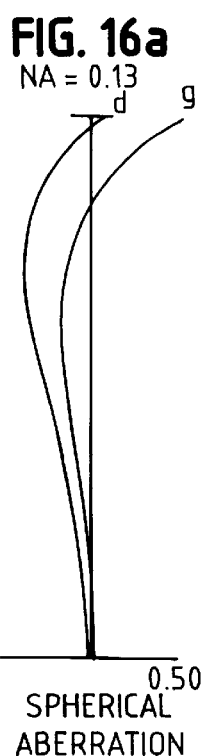
FIG. 16a
NA = 0.13
0.500
SPHERICAL ABERRATION
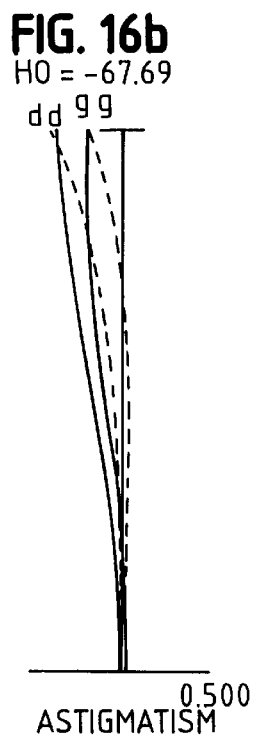
FIG. 16b
HO = -67.69
0.500
ASTIGMATISM
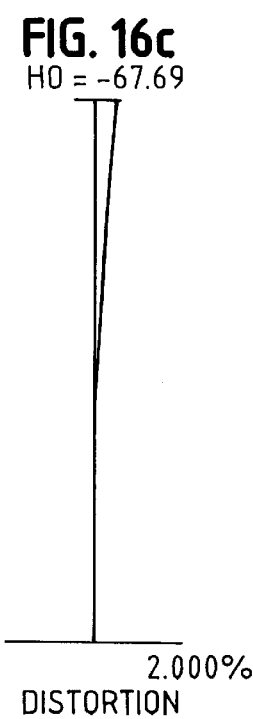
FIG. 16c
HO = -67.69
2.000%
DISTORTION
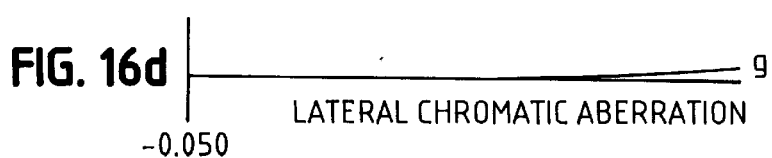
FIG. 16d LATERAL CHROMATIC ABERRATION
-0.050
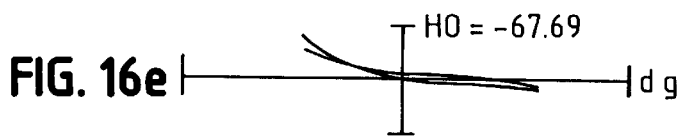
FIG. 16e HO = -67.69
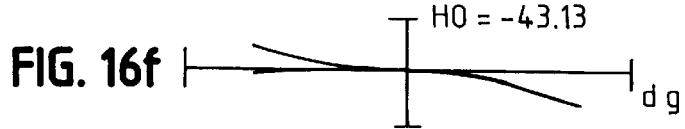
FIG. 16f HO = -43.13
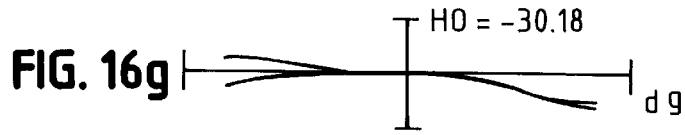
FIG. 16g HO = -30.18
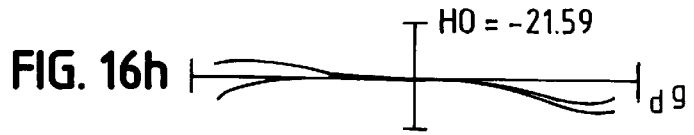
FIG. 16h HO = -21.59
FIG. 16i HO = 0.0
COMA ABERRATION  0.100

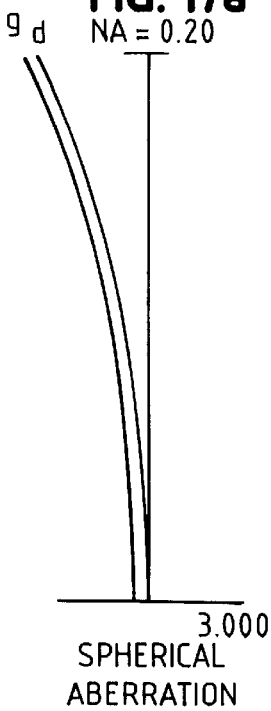
FIG. 17a
$g_d$ NA = 0.20
3.000
SPHERICAL
ABERRATION
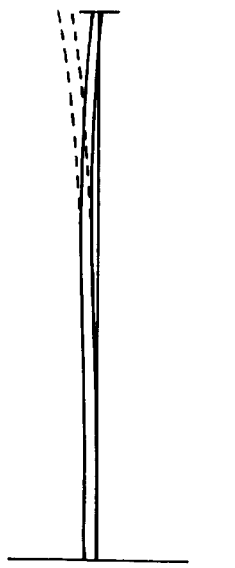
FIG. 17b
HO = -339.24
$g_d$ $g_d$
3.000
ASTIGMATISM
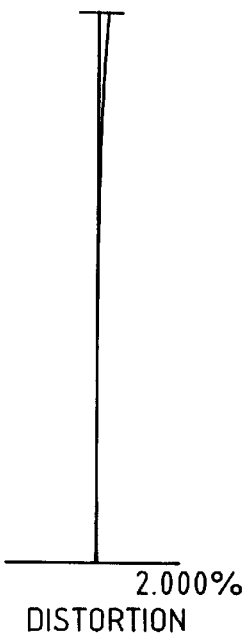
FIG. 17c
HO = -339.24
2.000%
DISTORTION
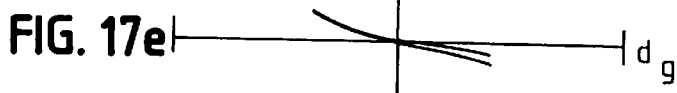
FIG. 17d
-0.050  LATERAL CHROMATIC ABERRATION   g
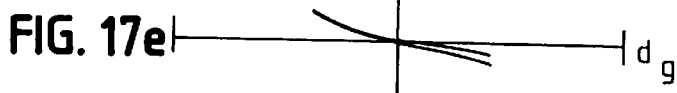
FIG. 17e    HO = -339.24    d g
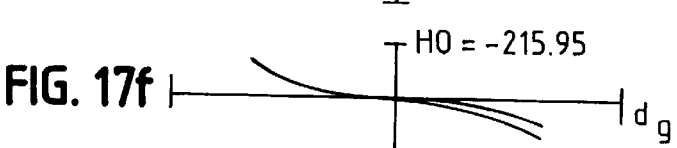
FIG. 17f    HO = -215.95    d g
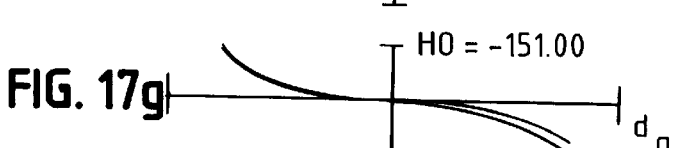
FIG. 17g    HO = -151.00    d g
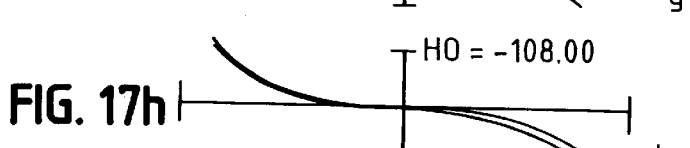
FIG. 17h    HO = -108.00    d g
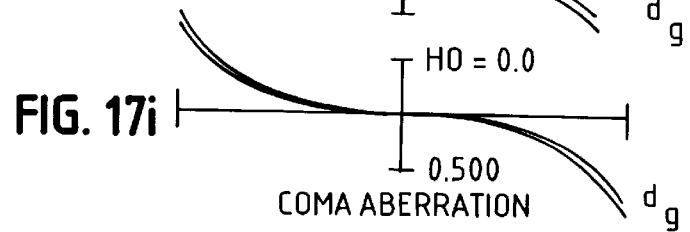
FIG. 17i    HO = 0.0    d g
0.500
COMA ABERRATION

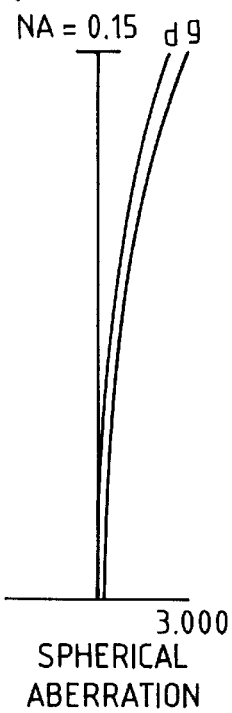
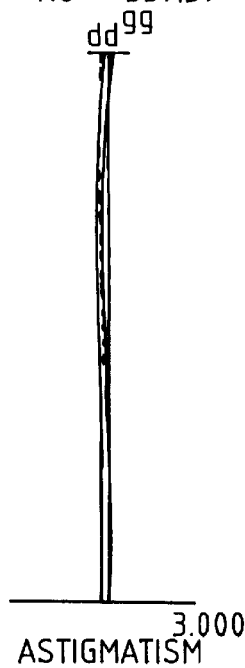
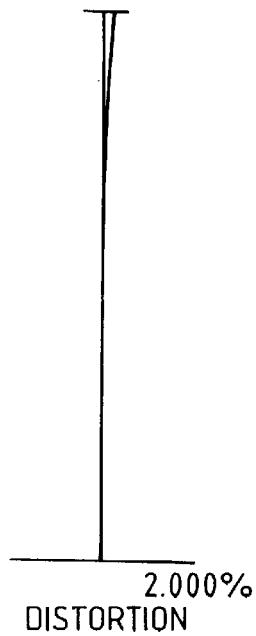
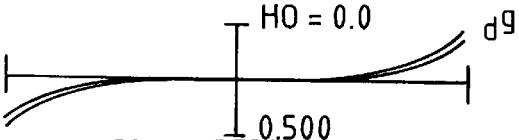

ABERRATION CONTROLLABLE OPTICAL SYSTEM

BACKGROUND OF THE INVENTION

1. Field of the Invention

This invention relates to an aberration-controllable optical system and, more particularly, to a variable soft focus lens that can provide a soft focus image having a relatively wide view angle and to defocus image controllable optical systems that possess the performance to properly correct blurred phase.

The invention also relates to a variable aberration optical system having a macro mechanism and, in particular, to a variable soft focus lens which can conduct focusing even in a macro region and can provide a soft focus image with a relatively large image angle and large aperature.

The invention additionally relates to an optical system with variable degree of blur which functions to satisfactorily correct the blur.

2. Description of Related Art

Soft focus optical systems which are capable of providing soft focus effects have long been known. In particular, the use of variable soft focus lenses that enable one to continuously vary soft focus effects has become common in soft focus lens technology. For instance, Japanese Patent Application Laid-Open No. 52-76921 discloses an optical system that uses Tessar-type or triplet-type lenses having a relatively small view angle in the master lens group. A negative meniscus lens is attached behind the master lens group. In this arrangement, spherical aberrations of the system can be continuously controlled by varying the air gap between the master component and the negative meniscus lens.

Japanese Patent Application Laid-Open No. 53-109626 discloses an optical system in which Gauss-type lenses are used in the master lens group for the purpose of increasing the aperture size. A negative meniscus lens is attached behind the master lens group. Spherical aberrations are continuously controlled by varying the gap between the master lens group and the negative meniscus lens.

Furthermore, although it is not designed to provide the soft focus effects, the optical system disclosed by Japanese Patent Application Laid-Open No. H1-259314 can control the depiction of out-of-focus regions mainly by continuously producing spherical aberrations. The optical system described in this publication has effects similar to soft focus effects.

The variable soft focus lens systems disclosed in published Japanese patent application Nos. 52-76921 and 53-109626 mentioned above possess a lens position in the normal mode, in which a sharp photo-quality is obtained, and can continuously produce spherical aberrations by controlling variable gaps. However, the angle of view (2ω) of these systems is only 28°, which is relatively small. Further, the systems are inferior in coma symmetry, which is necessary to create beautiful soft focus or defocus images. This system produces only either negative spherical aberrations or positive spherical aberrations at the sharp-image position mentioned above. Any attempt to forcefully produce both positive and negative aberrations results in further deterioration of symmetry in the coma, which prevents one from obtaining beautiful soft focus or defocus images. In addition, the lens elements may mechanically interfere with each other under poor symmetry conditions.

Japanese Laid-Open Patent Publication No. 52-76921 also discloses an optical system in which a converter lens group having a positive refractive power is positioned behind the master lens group. This optical system can control the spherical aberrations by varying the air-gap inside the converter lens group. However, since the system employs Tessar-type and/or triplet-type lenses for the master lens group, the total length of the system cannot be decreased when the refractive power of the converter lens group is positive, and when the master lens group has the same focal length as the converter lens group.

According to this technique, moreover, variation in aberration associated with the focusing operation for an object located at a short distance is large in a normal mode, which should provide sharp image quality. The focusing operation in the macro region (e.g., a region corresponding to a magnification of ¼ or more) cannot be satisfactorily conducted.

In the optical system disclosed in Japanese Laid-Open Patent Publication No. H1-259314, a controllable gap for varying spherical aberrations is provided closest to the object side. In this arrangement, a satisfactory symmetry in the coma, which is necessary to achieve beautiful soft focus images or defocus images, can not be obtained. Moreover, spherical aberrations are insufficient to obtain beautiful soft focus images.

The optical system disclosed in this publication adopts a rear focus technique in which the focusing operation is conducted by moving a lens group located on an image-side of the optical system. However, according to this technique, a lens diameter of the focusing lens group (i.e., the lens group which can be moved for the focusing operation) and focusing moving amount thereof (the amount of movement required for the focusing operation) are relatively large. Thus, it is impossible to conduct the focusing operation in the macro region (e.g., a region corresponding to a magnification of ¼ or more) satisfactorily.

The present invention was conceived to overcome the above mentioned problems, and aims to provide an aberration-controllable optical system that has an adequately large angle of view, and is capable of continuously varying the spherical aberrations from negative values to positive values including a sharp image or photo quality state. Focusing in a macro region can be conducted as a result.

SUMMARY OF THE INVENTION

In order to solve the problems present in conventional optical systems, the aberration-controllable optical system according to the invention includes a master lens group having a positive refractive power and a converter lens group having a negative refractive power in this order from the object side. The master lens group consists of a first sub lens group having a positive refractive power, a second sub lens group having a negative refractive power, and a third sub lens group having a positive refractive power, in this order from the object side. The converter lens group includes a lens element having a positive refractive power and a lens element having a negative refractive power in this order from the object side. An air gap is formed between the positive lens element and the negative lens element has a concave surface facing an aperture stop. The on-axis distance of the air gap is changed mainly in order to vary the spherical aberrations in the system. The aberration-controllable optical system satisfies the following condition.

$$-1 < f_M/f_C < 0.$$

where $f_M$ is the focal length of the master lens group during focusing an infinity object and $f_C$ is the focal length of the converter lens group during focusing an infinity object and at a lens position with minimum spherical aberrations.

According to our aspect of the invention, the master lens group includes a front group and a rear group arranged in that order from the object. A focusing operation on an object located at a close distance is conducted by moving the front lens group and the rear lens group independently of each other.

Preferably, the aberration-controllable optical system further satisfies the following condition:

$0 < f_N/f_C < 1$.

where $f_N$ is the focal length of the negative lens element and $f_C$ is the focal length of the converter lens group during focusing an infinity object at a position with minimum spherical aberrations.

In addition, when $v_p$ is the Abbe number of the negative lens element $L_N$, and $v_N$ is the Abbe number of the positive lens element $L_P$, it is preferable for the aberration-controllable optical system to satisfy the following condition:

$-10 < v_p - v_n < 30$.

In one preferred embodiment of the present invention, a distance between the front lens group and the rear lens group increases during the focusing on the object located at a short distance.

Moreover, it is preferable to satisfy the following condition:

$0 < M_A/M_B < 10$ where $M_A$ is the moving amount of the front lens group for focusing and $M_B$ is the moving amount of the rear lens group for focusing.

BRIEF DESCRIPTION OF THE DRAWINGS

FIG. 1 is a view of the structure and the shift track of the aberration-controllable optical system according to a first embodiment.

FIG. 2 illustrates various aberrations of the first embodiment during focusing an infinity object and in the normal mode with least spherical aberrations.

FIG. 3 illustrates various aberrations of the first embodiment during focusing an infinity object and in a soft focus mode with satisfactory background blur in the out-of-focus image of the background.

FIG. 4 illustrates various aberrations of the first embodiment during focusing an infinity object and in a soft focus mode with satisfactory foreground blur in the out-of-focus image of the foreground.

FIG. 5 is a view of the structure and the shift track of the aberration-controllable optical system according to a second embodiment.

FIG. 6 illustrates various aberrations of the second embodiment during focusing an infinity object and in the normal mode with least spherical aberrations.

FIG. 7 illustrates various aberrations of the second embodiment during focusing an infinity object and in a soft focus mode with satisfactory background blur in the out-of-focus image of the background.

FIG. 8 illustrates various aberrations of the second embodiment during focusing an infinity object and in a soft focus mode with satisfactory foreground blur in the out-of-focus image of the foreground.

FIG. 10 shows various types of aberration in a state in which focusing is conducted at infinity in a normal mode providing the least amount of spherical aberration.

FIG. 11 shows various types of aberration in a state where focusing is conducted at infinity in a soft focus mode (1) providing an excellent rear blur (a background out-focus portion of an image).

FIG. 13 shows various types of aberration at a magnification of ⅟30 in a normal mode providing the least amount of spherical aberration.

FIG. 14 shows various types of aberration at a magnification of ⅟10 in a normal mode providing the least amount of spherical aberration.

FIG. 15 shows various types of aberration at a magnification of ⅟3.33 in a normal mode providing the least amount of spherical aberration.

FIG. 16 shows various types of aberration at a magnification of ½ in a normal mode providing the least amount of spherical aberration.

FIG. 17 shows various types of aberration at a magnification of ⅟10 in a soft focus mode (1) providing an excellent rear blur.

FIG. 18 shows various types of aberration at a magnification of ⅟10 in a soft focus mode (2) providing an excellent front blur.

DESCRIPTION OF THE PREFERRED EMBODIMENTS

Figure 9:
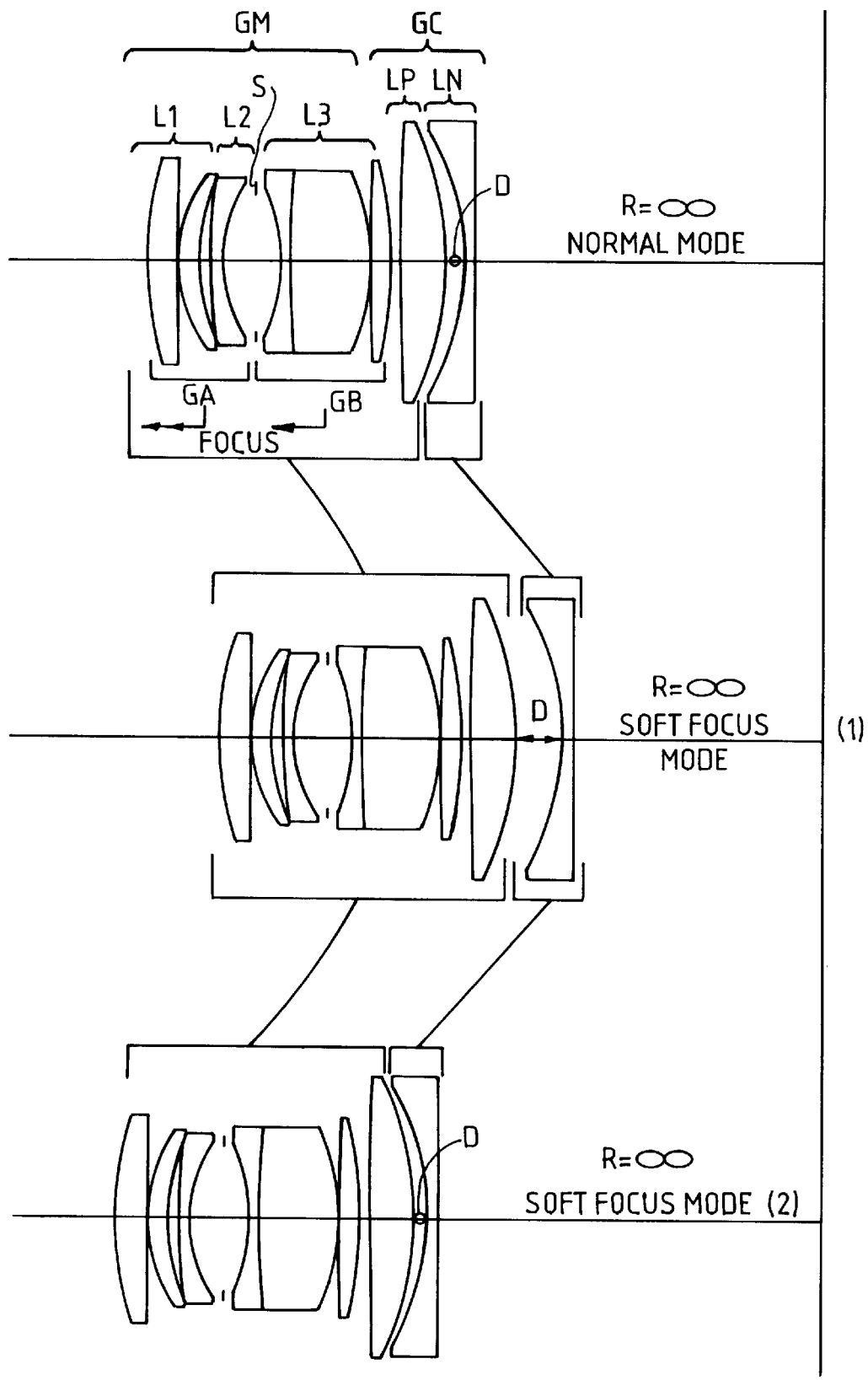
FIG. 9 shows a configuration of a variable aberration optical system according to another embodiment of the present invention and movement tracks therein.
Figure 12A:
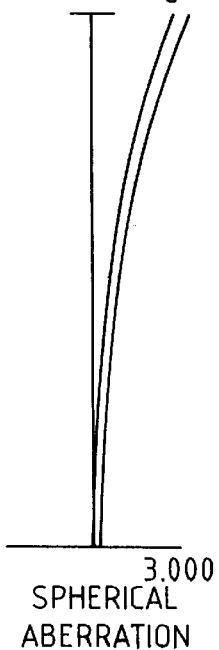
FIG. 12 shows various types of aberration in a state where focusing is conducted at infinity in a soft focus mode (2) providing an excellent front blur (a foreground out-focus portion of an image).
Figure 12B:
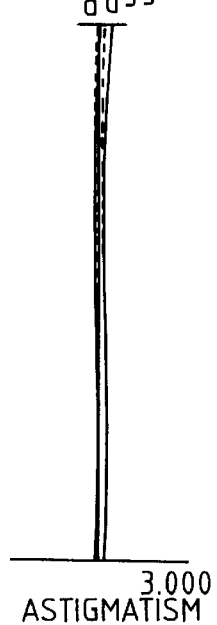
Figure 12C:
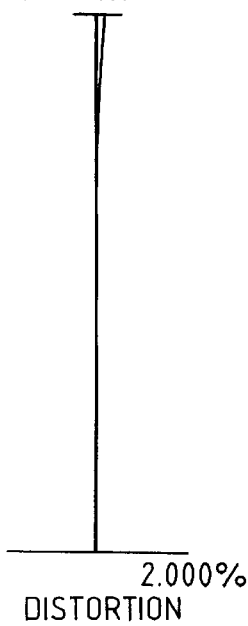
Figure 12D:
Figure 12E:
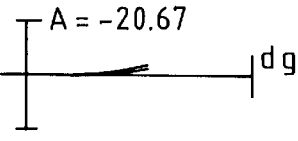
Figure 12F:
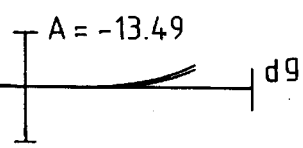
Figure 12G:
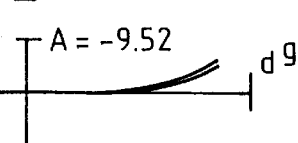
Figure 12H:
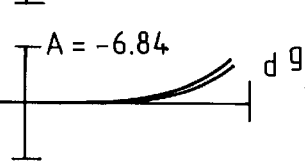
Figure 12I:
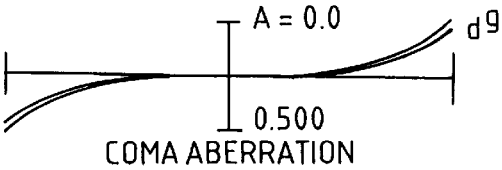

First, a fundamental structure of the invention will be explained.

The aberration-controllable optical system of this invention uses a lens type that can achieve a relatively large image angle or angle of view and a large aperture diameter for a master lens group GM and adequately corrects various aberrations, including a chromatic aberration. Examples of this type of lens include so-called "Xenoter" type lenses and Gauss type lenses. On the other hand, a converter lens group GC provides a desirable telocentric or telephoto ratio which allows the system to be made compact. The converter lens group GC also assures a sufficient back focal distance to shift the lens groups for the purpose of performing the defocus image control and variable soft focus effects.

In this context, the defocus image control is an operation for changing the aberrations to the extent that the resolution and contrast on the image plane of an object being photographed would not be significantly affected. With this function, the system can control the depiction or impression of the resultant photographs. In particular, blurred phase effects can be controlled by selectively causing a distinct change in the foreground blur or the background blur by varying the aberrations.

In the soft focus mode, aberrations (especially, spherical aberrations) are greatly changed to reduce a contrast in the view screen that mainly corresponds to each frequency component. As a result, the soft focus effect creates a so-called soft tons in which a flare effect is generated. Hence, in the soft focus mode, the contrast on the image plane of the object, which corresponds mainly to each frequency component of the light beams, changes virtually.

The master lens group GM and the converter lens group GC are sufficiently separated from each other so that the variable air gap D is moved away from the pupil (or the aperture stop) along the optical axis, thereby adequately changing spherical aberrations. When the air gap D is moved away from the aperture stop, the exiting oblique light beam and the incident oblique light beam, from and into the positive lens element $L_P$ and the negative lens element $L_N$, are located away from the optical axis. This can increase the deflection angle with respect to the positive lens element $L_P$ and the negative lens element $L_N$. As a result, the upper and the lower light beams which pass through this lens system can create substantially similar deflection angles. Highly symmetric flare is generated over the entire area of the view screen.

In a soft-focus lens system or blur-controllable optical system having a large angle of view, the optical performance to generate highly a symmetric flare is one of the most important factors. Optical performance to control the amount of spherical aberrations is also important. Furthermore, the space between the positive lens element $L_P$ and the negative lens element $L_N$ is delimited by a concave surface toward the aperture stop. This structure is advantageous to keep field curvature and asymmetric aberration components, such a coma, from arising when changing the on-axis distance D of the air gap to mainly vary the spherical aberrations. This structure also allows spherical aberrations that contain high-degree components to be generated by a small shift amount of the lens group.

The conditions set forth in the present invention to optimize performance of the present system will be explained below.

The aberration-controllable optical system according to the invention satisfies the condition:

$$-1 < f_M/f_C < 0 \qquad (1)$$

where $f_M$ is the focal length of the master lens group $G_M$ during focusing an infinity object and $f_C$ is the focal length of the converter lens group $G_C$ during focusing an infinity object and at a lens position with minimum spherical aberrations.

Condition (1) defines the preferable optimal range of the ratio between the focal length $f_M$ of the master lens group GM and the focal length $f_C$ of the converter lens group GC. If the value $f_M/f_C$ is below the lower limit of condition (1), then the refractive power of the converter lens group GC grows extremely large, provided that the focal length $f_M$ of the master lens group GM is constant. Consequently, the distance HH' between the object side principal point and the image side principal point must be increased in order to maintain the same focal length. This forces the converter lens group GC to become large. Also, as a result, the back focal distance becomes extremely short, which renders this optical system inappropriate for application to single-lens reflex cameras. It is preferably to set the lower limit of condition (1) to −0.5 and, more preferably, to −0.4 to further miniaturize the optical system.

If $f_M/f_C$ exceeds the upper limit of condition (1), then the converter lens group GC would have a positive refractive power. However, it is essential for the converter lens group GC to have a negative refractive power in order to provide an optical system that has a large angle of view, a large aperture diameter, and a sharp image position in which aberrations are suppressed as much as possible to provide a high-quality image, and to provide adequate spherical aberrations in both positive and negative directions. Moreover, the negative refractive power of the converter lens group GC provides a sufficient amount of back focal distance and satisfactorily corrects various aberrations. Thus, above the upper limit of condition (1), the optical system does not have the telephoto-type power arrangement any longer because of inconsistence with the essential structure of the invention. Furthermore, the diameter of the rear lens increases, and it becomes very difficult to make the system compact. The effects and advantages of the invention can be optimally realized by setting the upper limit of condition (1) to −0.01, or for the best results to −0.12.

It is desirable for the system to satisfy the following condition:

$$0 < f_N/f_C < 1 \qquad (2)$$

where $f_N$ is the focal length of the negative lens $L_N$.

Condition (2) defines the preferable range of the ratio between the focal length $f_N$ of the negative lens group $L_N$ and the focal length $f_C$ of the converter lens group GC.

Provided that the refractive power of the converter lens group GC is constant, the refractive power of the negative lens $L_N$ becomes too strong in the vicinity of the lower limit of the condition defined by equation (2). This makes it difficult to satisfactorily correct various kinds of aberrations at a sharp image position (that is, in the normal mode). Aberrations could be successfully corrected by, for example, increasing the number of the lens elements; however, the sensitivity to offset grows as the number of lens elements increases, which makes the manufacturing process difficult.

Below the lower limit of the condition defined by equation (2), the ratio becomes negative, which means that either the negative lens element $L_N$ or the converter lens group GC has a positive refractive power. As has been explained, the converter lens group GC must have a negative refractive power to satisfy the essential structure of the invention; otherwise a primary object of the invention would not be achieved. This object is to provide an optical system that has a large angle of view and a large aperture diameter, and which precessed a sharp image position in which aberrations are suppressed as much as possible to provide a high-quality image, while adequate spherical aberrations are produced in both positive and negative directions.

If the ratio exceeds the upper limit of condition (2), then the refractive power of the negative lens element $L_N$ becomes too weak to sufficiently change the spherical aberrations, provided that the refractive power of the converter lens group GC is constant. Any attempt to generate a sufficient amount of change in the spherical aberrations by shifting the lens group in greater length causes the change in the total length of the optical system to increase. This creates a position at which the back focal distance becomes extremely short in the varying soft focus mode. On the other hand, at another position in the varying soft focus mode that generates spherical aberrations with a sign opposite to those produced by the shortened back focal position, the lens elements $L_P$ and $L_N$ cause mechanical interferences. Consequently, the spherical aberrations can not be sufficiently changed. Preferably, the upper limit of condition (2) is set to 0.6 or, for the best results, to 0.4 to adequately change the spherical aberrations.

It is desirable for the aberration-controllable optical system to satisfy the following condition:

$$-10 < v_N - v_P < 30 \qquad (3)$$

where $v_N$ is the Abbe number of the negative lens element $L_N$, and $v_P$ is the Abbe number of the positive lens element $L_P$.

Condition (3) defines the preferable range of the difference between the Abbe number $v_P$ of the negative lens element $L_N$ and the Abbe number $v_N$ of the positive lens element $L_P$. The converter lens group GC has a negative refractive power independent from the master lens group GM. Hence, considering the chromatic aberrations of the overall optical system, it is desirable for the converter lens group GC to be achromatized. In other words, it is preferable to make the negative lens of an optical material having a low dispersion, and to make the positive lens of an optical material having a high dispersion, as in a regular achromatized negative lens group. In the optical system of the present invention, the air gap D between the positive lens $L_P$ and the negative lens $L_N$ is changed. Because an excessive difference in the dispersion values of the two lens components induces fluctuation in the chromatic aberrations, it is desirable to give an appropriate difference between the dispersion values of the two lens components.

If the difference is below the lower limit of condition (3), that is, if the negative lens has a dispersion value greater than that of the positive lens, then the achromatic state becomes opposite to that in an ordinary negative lens group. As a result, fluctuation in the chromatic aberrations increases, which prevents satisfactory optical performances. As an advantageous feature of the invention, the master lens group GM has a structure that possesses an adequate degree of freedom in the correction of the chromatic aberrations. Accordingly, it is possible for the negative lens to have a high dispersion slightly larger than that of the positive lens. Preferably, the lower limit of condition (3) is set to −7, or for a better result, to −5 in order to achieve an excellent achromatic property. One can expect the optimal result when setting the lower limit of condition (3) to −2.5.

If the difference exceeds the upper limit of condition (3), that is, if the dispersion of the positive lens becomes slightly larger than that of the negative lens, then the chromatic aberration again fluctuates as the air gap D between the lens elements $L_P$ and $L_N$ changes. Preferably, the upper limit of condition (3) is set to 25 or, for a better result, to 15 in order to achieve the satisfactory achromatic effect. One can expect the optimal achromatization effect when setting the upper limit of condition (3) to 10.

The aberration-controllable optical system of the invention further satisfies the following condition:

$$-1<(rb-ra)/(rb+ra)<0 \quad (4)$$

where ra is the radius of curvature of the image side surface of the positive lens positioned closest to the image side in the positive lens $L_P$ and rb is the radius of curvature of the object side surface of the negative lens positioned closest to the object side in the negative lens $L_N$.

Condition (4) defines the preferable range of the reciprocal of the shape factor of the air lens which is formed between the positive lens $L_P$ and the negative lens $L_N$.

Below the lower limit of condition (4), the shape of the air lens changes from plano-convex with a convex surface toward the image side to bi-convex. In such a case, any change in the air gap D causes all kinds of aberrations other than spherical aberrations and, especially, distortion and asymmetric coma. These problems can be suppressed by setting the lower limit of condition (4) to −0.5 or, for a better result, to −0.2.

In the vicinity of the upper limit of condition (4), the air lens will have a meniscus shape which has a sharp convex surface on the image side. As a result, the deflection angles of the incident light beams and the reflected light beams with respect to the respective surface of the air lens becomes large, which generates a great deal of high-degree aberrations. Consequently, the optical performance of the system is worsened at a shape-image position (i.e., in the normal mode), which contradicts the object of providing a high-quality image. Moreover, the allowances for the offset, the gaps between lenses and the lens thickness become strict, which is disadvantageous for manufacture. One can fully achieve optimal system performance by setting the upper limit of condition (4) to −0.005 or, for best results, to −0.01.

Preferably, the aberration-controllable optical system of the invention further satisfies the following condition:

$$-0.25<n_N-n_P<0.35 \quad (5)$$

where $n_N$ is the refractive index of the negative lens inside the negative lens element $L_N$ with respect to the d-line, and $n_P$ is the refractive index of the positive lens inside the positive lens element $L_P$ with respect to the d-line.

Condition (5) defines the preferable range of the difference between $n_N$ and $n_P$.

Below the lower limit of condition (5), the refractive index of the negative lens component $L_N$ becomes extremely small. As a result, great amounts of various kinds of aberrations of high degree are generated, which deteriorates the optical performance of the system in the normal mode. The difference in condition (5) is preferably set to −0.2 or, for a better result, to −0.15 to generate appropriate amount of spherical aberrations while suppressing other aberrations, such as field curvature and asymmetric coma.

Above the upper limit of condition (5), the refractive index of the positive lens $L_P$ becomes extremely small, which makes it difficult to set the Petzval sum to an appropriate value. As a result, field curvature becomes large. The upper limit of condition (5) is preferably set to 0.25 or, more favorably, to 0.2 to fully exhibit the performance of the system.

The aberration-controllable optical system further satisfies the following condition:

$$-10<(rd+rc)/(rd-rc)<1 \quad (6)$$

where rc is the radius of curvature of the object side surface of the positive lens $L_P$, and rd is the radius of curvature of the image side surface of the positive lens $L_P$.

Condition (6) defines the preferable range of the shape factor of the positive lens element $L_P$ in the converter lens group GC.

Below the lower limit of condition (6), the positive lens element $L_P$ will have a radically meniscus shape, which causes high-degree aberrations. Under the influence of high-degree aberrations, the optical performance of the system in the normal mode tends to deteriorate. One can achieve the optimal performance of the system by setting the lower limit of condition (6) to −5.

Conversely, above the upper limit of condition (6), the positive lens element $L_P$ will have a meniscus shape with a convex surface facing the object side. If this is the case, any change in the air gap D induces an unacceptable amount of aberrations, except for spherical aberrations. Field curvature and asymmetric coma particularly arise.

The aberration-controllable optical system further satisfies the following condition:

$$1<(rf+re)/(rf-re)<10 \quad (7)$$

where re is the radius of curvature of the object side surface of the negative lens element $L_N$ and rf is the radius of curvature of the image side surface of the same.

Condition (7) defines the preferable range of the shape factor of the negative lens element $L_N$ in the converter lens group GC.

Below the lower limit of condition (7), the negative lens element $L_N$ changes its shape from a plano-concave shape with the concave surface facing the image side into a meniscus shape with the concave surface facing the image side. This causes the shape of the air lens to deviate from a meniscus shape. If the air gap D is changed in this state, then various kinds of aberrations, besides spherical aberrations, occur. Particularly, a great amount of field curvature and asymmetric coma arises. This is not desirable. One can achieve full performance of the system by setting the lower limit of condition (7) to 0.

Above the upper limit of condition (7), the negative lens element $L_N$ will have an extreme meniscus shape, which causes high-degree aberrations. Under the influence of the high-degree aberrations, the optical performance of the system is worsened at a sharp image position in the normal mode. This is one of the advantageous features of the invention. It is preferable to set the upper limit of condition (7) to 5 or, for a better result, to 2 or 1.5, to fully exhibit the effects of the invention.

In order to produce a desirable amount of spherical aberration and coma corresponding to a large aperture diameter, the first sub lens group L1 of the master lens group GM has two positive lenses. At the same time, in order to correctly set the Petzval sum and to adequately achromatize, the third sub lens group L3 has a positive lens and a cemented lens that is composed of a negative lens and a positive lens.

It is preferable for each of the positive lens element $L_P$ and the negative lens element $L_N$ in the converter lens group GC to consist of one lens for the purpose of cost reduction and simplification.

In the following, each example that embodies the invention will be explained based on the accompanying diagrams. The aberration-controllable optical system (ACOS for short) in each example comprises a master lens group GM having a positive refractive power and a converter lens group GC having a negative refractive power in this order from the object side. The master lens group GM includes a first sub lens group L1 having a positive refractive power, a second sub lens group L2 having a negative refractive power, and a third sub lens group L3 having a positive refractive power in this order from the object side. The converter lens group GC consists of a positive lens element $L_P$ having a positive refractive power and a negative lens element $L_N$ having a negative refractive power, in this order from the object side.

FIG. 1 illustrates the structure and the shift track of the aberration-controllable optical system according to the first embodiment of the invention.

In FIG. 1, the master lens group GM consists of a first sub lens group $L_1$, which consists of a bi-convex lens and a positive meniscus lens with its convex surface facing the object side, a second sub lens group L2 which consists of a biconcave lens, an aperture stop S, and a third sub lens group L3 which consists of a cemented negative lens composed of a negative meniscus lens with a concave surface facing the object side and a positive meniscus lens with a convex surface facing the object side, and a bi-convex lens, in this order from the object side.

The converter lens group GC consists of a positive meniscus lens $L_P$ with a concave surface facing the object side and a negative meniscus lens $L_N$ with a concave surface facing the object side, in this order from the object side.

The diagram shown on the top of FIG. 1 depicts the normal mode, as the reference mode, in which a sharp image can be obtained with least spherical aberrations. From this state, the negative meniscus lens $L_N$ is shifted in such a way that the on-axis air gap D between the positive meniscus lens $L_P$ and the negative meniscus lens $L_N$. will increase to achieve the soft focus mode (1), which is depicted in the middle of FIG. 1. The soft focus mode (2), shown at the bottom of FIG. 1, is achieved by shifting the negative meniscus lens $L_N$ in such a way that the on-axis air gap D will decrease. Since the back focal distance changes as the negative meniscus lens $L_N$ gets shifted, the change in the back focal distance is corrected by shifting the master lens group GM and the positive meniscus lens $L_P$ together.

In this embodiment, zooming toward a short-range object was accomplished by advancing the entire optical system toward the object side. Using this zooming method, macrophotography with a magnification up to ¼ is possible.

Table 1 lists various parameter values obtained from the first embodiment. In table 1, "f" denotes a focal length in mm, "F No" denotes a F-number, 2ω denotes an angle of view, Bf denotes a back distance in mm, and D0 denotes the distance in mm along the optical axis between the object and the surface closest to the object. The surface numbers represent the serial order of lens surfaces in the advancing direction of the light beam. The refractive indices and the abbe numbers are measured with respect to the d-line (λ=587.6 nm).

TABLE 1 f = 105
F NO = 2.83
2ω = 35.72°

| LENS SURFACES | RADIUS OF CURVATURE | DISTANCE BETWEEN ADJACENT SURFACES | ABBE NUMBER | REFRACTIVE INDEX |
|---|---|---|---|---|
| 1 | 185.3082 | 4.0000 | 60.64 | 1.603110 |
| 2 | −163.2324 | 0.1000 | | |
| 3 | 33.0757 | 7.0000 | 82.52 | 1.497820 |
| 4 | 84.3311 | 2.3000 | | |
| 5 | −282.0428 | 1.8000 | 45.87 | 1.548139 |
| 6 | 39.4465 | 6.6000 | | |
| 7 | infinity | 6.5000 | (aperture stop S) | |
| 8 | −29.4505 | 1.8000 | 36.98 | 1.612930 |
| 9 | −223.1023 | 7.5000 | 53.75 | 1.693500 |
| 10 | −37.4314 | 0.1000 | | |
| 11 | 392.7974 | 4.5000 | 50.84 | 1.658440 |
| 12 | −76.2736 | 6.2824 | | |
| 13 | −247.6209 | 5.0000 | 37.90 | 1.723421 |
| 14 | −52.9649 | (d 14 = variable) | | |
| 15 | −40.5667 | 2.0000 | 36.98 | 1.612930 |
| 16 | −1871.6154 | (B f) | | |

TABLE 1-continued (Variable Gaps during Soft Focusing and Zooming)

| f&β | 105.00000 | 94.00000 | 112.00000 | −0.03333 | 0.10000 |
|---|---|---|---|---|---|
| DO | ∞ | ∞ | ∞ | 3244.5250 | 114.0400 |
| d14 | 4.20977 | 8.14357 | 2.19293 | 4.20977 | 4.20977 |
| Bf | 69.46796 | 54.76221 | 78.45128 | 72.97376 | 79.98537 |
| β | −0.25000 | −0.03333 | 0.100000 | −0.0333 | −0.10000 |
| DO | 509.9955 | 2900.8090 | 1020.8086 | 3454.4867 | 1214.4859 |
| d14 | 4.20977 | 8.14357 | 8.14357 | 2.19293 | 2.19293 |
| Bf | 95.76148 | 57.89554 | 64.16221 | 82.18461 | 89.65128 |

(condition-corresponding values)

(1) $f_M/f_C =$ −0.2955
(2) $f_N/f_C =$ 0.2286
(3) $v_N - v_P =$ −0.92
(4) $(rb - ra)/(rb + ra) =$ −0.1326
(5) $n_N - n_P =$ −0.1105
(6) $(rd + rc)/(rd - rc) =$ −1.544
(7) $(rf + re)/(rf - re) =$ 1.044

FIG. 2 through FIG. 4 illustrate various aberrations arising in the first embodiment. FIG. 2 shows the aberrations in the afocal state and in the normal mode in which spherical aberration is at a minimum. FIG. 3 shows the aberrations during focusing an infinity object and in the soft focus mode with satisfactory background blur (in the out-of-focus image of the background). FIG. 4 shows the aberrations during focusing an infinity object and in the soft focus mode with satisfactory foreground blur (in the out-of-focus image of the foreground).

In each diagram, "F NO" denotes the F-number, A denotes a half angle of view in degrees, d denotes the d-line (λ=587.6 nm), and g denotes the g-line (λ=435.8 nm). In the diagram showing astigmatism, the solid curves represent the sagittal image plane and the broken curves represent the meridional image plane.

It is clear from FIG. 2 that various aberrations are satisfactorily corrected over a wide angle of view in the normal mode, as in regular photo lenses.

FIG. 3 shows that, in the soft focus mode (1), the negative spherical aberrations and the off-axis spherical aberrations (the symmetric flare component of the coma) are generated in great amounts, and that the variations in other aberrations, in particular those of the off-axis aberrations, are suppressed. The invention enables one to continuously control the amount of aberrations between the normal mode and the soft focus mode (1). By shifting the lenses from the normal mode to the soft focus mode (1), one can perform the defocus-image control that produces only the background blur to a desirable level without worsening the performance of the image plane.

FIG. 4 shows that, in the soft focus mode (2), the positive spherical aberrations and the off-axis spherical aberrations (the symmetric flare component of the coma) are generated in great amounts, and that the variations in other kinds of aberrations, in particular those of the off-axis aberrations, are suppressed. One is able to continuously control the amount of aberrations between the normal mode and the soft focus mode (2). By shifting the lenses from the normal mode to the soft focus mode (2), one can perform the defocus-image control that produces only the foreground blur to a desirable level without worsening the performance of the image plane.

In the first embodiment, variations in the back focal distance are corrected by shifting the master lens group GM and the positive meniscus lens $L_P$ together. However, depending on the shifting amount of the negative lens element $L_N$ for varying spherical aberrations, various other methods may be used to correct variations in the back focal distance. For instance, the variations in the back focal distance can be corrected by shifting the master lens group GM alone or by shifting the positive meniscus lens $L_P$ alone. Alternatively, a compensation lens group may be separately provided to correct a change in the back focal distance.

Although, in this embodiment, zooming to a short-range object is performed by advancing the entire optical system toward the object side, various other methods of zooming to a short-range object are available. For instance, one can zoom to a short-range object by shifting the master lens group GM alone or by shifting (floating) both the master lens group GM and the converter lens group GC independently.

FIG. 5 shows the structure and the shift track of the aberration-controllable optical system according to the second embodiment. In the aberration-controllable optical system shown in FIG. 5 the master lens group GM consists of a first sub lens group L1, which consists of a bi-convex lens and a positive meniscus lens with a convex surface facing the object side, a second sub lens group L2 which consists of a negative meniscus lens with a convex surface facing the object side, an aperture stop S, and a third sub lens group L3, which consists of a cemented negative lens composed of a bi-concave lens and a bi-convex lens, and one bi-convex lens, in this order from the object side. The converter lens group GC consists of a bi-convex lens $L_P$ and a bi-concave lens $L_N$ with a concave surface facing the object side (or the aperture stop S), in this order from the object side.

In the second example, as shown in FIG. 5 the normal mode in which a sharp image can be obtained with least spherical aberrations is the reference mode. From this state, the negative meniscus lens $L_N$ is shifted in such a way that the on-axis air gap D between the bi-convex lens $L_P$ and the bi-concave lens $L_N$ will expand to achieve the soft focus mode (1). If the bi-concave lens $L_N$ is shifted in such a way that the on-axis air gap D will decrease, then the soft focus mode (2) is achieved shifting the bi-concave lens $L_N$ induces variations in the back focal distance. The changes in the back focal distance can be corrected by shifting the master lens group GM and the bi-convex lens $L_P$ together.

In the second embodiment, the master lens group GM is divided into a front group which consists of the first sub lens group L1 and the second sub lens group L2, and a rear group which consists of a third sub lens group L3. The front group and the rear group are independently shifted to perform zooming toward a short-range object. With this zooming method, macrophotography with a magnification of up to ½ is possible.

Table 2 shows experimental data from the second embodiments. Table 2, "f" denotes a focal length in mm, "F No" denotes a F-number, 2ω denotes an angle of view, Bf denotes a back focal distance in mm, and D0 denotes the distance in mm along the optical between the object and the surface closest to the object. The surface numbers represent the serial order of lens surfaces in the advancing direction of the light beam. The refractive indices and the Abbe numbers are measured with respect to the d-line (λ=587.6 nm).

It is clear from FIG. 6 that various aberrations are satisfactorily corrected over a wide angle of view in the normal mode, as in regular photo lenses.

FIG. 7 shows that, in the soft focus mode (1), the negative spherical aberrations and the off-axis spherical aberrations (the symmetric flare component of the coma) are generated in great amounts, and that the variations in other aberrations, in particular those of the off-axis aberrations, are suppressed. The invention enables one to continuously control the

TABLE 2 f = 85
F NO = 2.85
2ω = 43.5°

| LENS SURFACES | RADIUS OF CURVATURE | DISTANCE BETWEEN ADJACENT SURFACES | ABBE NUMBER | REFRACTIVE INDEX |
|---|---|---|---|---|
| 1 | 55.6538 | 5.0000 | 48.04 | 1.716999 |
| 2 | −2603.3146 | 0.1000 | | |
| 3 | 25.1841 | 3.4000 | 53.75 | 1.693500 |
| 4 | 38.3374 | 1.6000 | | |
| 5 | 92.2896 | 1.7000 | 36.98 | 1.612930 |
| 6 | 22.1322 | (d6 = variable) | | |
| 7 | ∞ | 4.0060 | (aperture stop S) | |
| 8 | −29.3026 | 1.7000 | 32.17 | 1.672700 |
| 9 | 196.5217 | 12.5000 | 53.89 | 1.713000 |
| 10 | −39.9515 | 0.10000 | | |
| 11 | 334.0512 | 3.5000 | 55.60 | 1.696800 |
| 12 | −73.6850 | (d12 = variable) | | |
| 13 | 2514.2791 | 7.0000 | 33.75 | 1.648310 |
| 14 | −49.2645 | (d14 = variable) | | |
| 15 | −45.2184 | 2.0000 | 40.90 | 1.796310 |
| 16 | 1264.3990 | (Bf) | | |

(Variable Gaps during Soft Focusing and Zooming)

| f&β | 85.02000 | 73.00000 | 90.00000 | −0.03333 | −0.10000 |
|---|---|---|---|---|---|
| D0 | ∞ | ∞ | ∞ | 2604.1136 | 902.5494 |
| d6 | 5.51671 | 5.51671 | 5.51671 | 6.06841 | 7.18198 |
| d12 | 1.96096 | 1.96096 | 1.96096 | 3.80796 | 7.53598 |
| d14 | 2.63421 | 7.07075 | 1.15230 | 2.63421 | 2.63421 |
| Bf | 55.73839 | 39.93660 | 62.24573 | 55.73839 | 55.73839 |
| β | −0.30000 | −0.50000 | −0.10000 | −0.50000 | −0.10000 | −0.50000 |
| D0 | 333.2842 | 217.3791 | 781.9516 | 192.1951 | 952.1982 | 227.6557 |
| d6 | 10.60870 | 14.17700 | 7.45963 | 15.69403 | 7.08942 | 13.6764 |
| d12 | 19.00804 | 30.95410 | 8.46553 | 36.03287 | 7.22613 | 29.27826 |
| d14 | 2.63421 | 2.63421 | 7.07075 | 7.07075 | 1.15230 | 1.15230 |
| Bf | 55.73840 | 55.73839 | 39.93660 | 39.93661 | 62.24572 | 62.24574 |

(condition-corresponding value)

(1) $f_M/f_C$ = −0.2958
(2) $f_N/f_C$ = 0.2288
(3) $v_N - v_P$ = 7.15
(4) $(rb - ra)/(rb + ra)$ = −0.0428
(5) $n_N - n_P$ = 0.148
(6) $(rd + rc)/(rd - rc)$ = −0.9616
(7) $(rf + re)/(rf - re)$ = 0.9309

FIG. 6 through FIG. 8 illustrate various aberrations of the second embodiment.

FIG. 6 shows various aberrations during focusing an infinity object and in the normal mode with least spherical aberrations. FIG. 7 shows various aberrations during focusing an infinity object and in the soft focus mode (1) with satisfactory background blur (in the out-of-focus image of the background). FIG. 8 shows various aberration diagrams during focusing an infinity object and in the soft focus mode (2) with satisfactory foreground blur (in the out-of-focus image of the foreground).

In each diagram, "F NO" denotes the F-number, A denotes a half angle of view in degrees, d denotes the d-line (λ=587.6 nm), and g denotes the g-line (λ=435.8 nm). In the diagram showing astigmatism, the solid curves represent the sagittal image plane and the broken curves represent the meridional image plane.

amount of aberrations between the normal mode and the soft focus mode (1). By shifting the lenses from the normal mode to the soft focus mode (1) one can perform the defocus-image control that produces only the background blur to a desirable level without worsening the performance of the image plane.

FIG. 6 shows that, in the soft focus mode (2), the positive spherical aberrations and the off-axis spherical aberrations (the symmetric flare component of the coma) are generated in great amounts, and that the variations in other kinds of aberrations, in particular those of the off-axis aberrations, are suppressed. The invention enables one to continuously control the amount of aberrations between the normal mode and the soft focus mode (2). By shifting the lenses from the normal mode to the soft focus mode (2), one can perform the defocus-image control that produces only the foreground blur to a desirable level without worsening the performance of the image plane.

In the second embodiment, variations in the back focal distance are corrected by shifting the master lens group GM and the positive meniscus lens $L_P$ together. However, depending on the shifting amount of the negative lens element $L_N$ for varying spherical aberrations, various other methods may be used to correct variations in the back focal distance. For instance, the variations in the back focal distance can be corrected by shifting the master lens group GM alone or by shifting the positive meniscus lens $L_P$ alone. Alternatively, a compensation lens group may be separately provided to correct for a change in the back focal distance.

In the second embodiment, zooming to a short-range object is performed by dividing the master lens group GM into the front group and the rear group, and by independently moving the front and rear groups. However, it is apparent that various other methods of zooming to a short-range object are available. For instance, one can zoom to a short-range object by advancing the entire optical system toward the object side or by shifting only the entire master lens group GM. Alternatively, both the master lens group GM and the converter lens group GC may be shifted (floated) independently for the short-range zooming.

According to the above embodiments, the aberration-controllable optical system has a large angle of view (approximately 43.5°) and a large aperture diameter with an F-number which is approximately 2.8. Furthermore, the system can continuously vary the spherical aberrations from negative values to positive values including a sharp-image point in the normal mode. With this aberration-controllable optical system, one can obtain beautiful soft focus images (or defocus images). In addition, macrophotography with a magnification up to ½ or ¼ is possible. Because the aberration-controllable optical system of each embodiment has a wide angle of view, an additional function of a so-called tilt-shift lens can be provided by further shifting the entire optical system. It is also possible to realize an anti-vibration optical system by shifting at least one of the master lens group GM and the converter lens group GC in the direction perpendicular to the optical axis.

An optical system which has a wide angle of view and which can continuously vary the spherical aberrations from negative value to positive values including a sharp-image point in the normal mode can be realized with the construction described.

According to another aspect of the present invention, a front lens group $G_A$ and a rear lens group $G_B$, shown in FIG. 9, are defined in the master lens group $G_M$. The front and rear lens groups are made to move independently of each other (i.e., floating) so as to conduct the focusing operation. Therefore, it is necessary to secure an aberration corrected state in which the master lens group $G_M$ and the converter lens group $G_C$ are separated from each other and appropriately independent with respect to an aberration mechanism. Since the converter lens group $G_C$ has negative refractive power, a focal length of the master lens group $G_M$ is shorter than that of the entire optical system. Thus, a reduction in the moving amount for the focusing operation, as compared to a technique in which the entire optical system is sent out, results. This is advantageous.

Furthermore, according to he present invention, by distinctly separating the master lens group $G_M$ and the converter lens group $G_C$, a space having a variable distance D for varying mainly the spherical aberration can be spaced away from a pupil (or an aperture stop). In this case, since light rays obliquely exiting from and obliquely incident upon the positive lens element $L_P$ and the negative lens element $L_N$ are away from an optical axis of the optical system, angles of deviation of the positive lens element $L_P$ and the negative lens element $L_N$ are increased. As a result, the deviation angle for upper light rays and the deviation angle for lower light rays can be made relatively close angles. Accordingly, flare which is satisfactorily symmetric even in a periphery of the image screen can be generated. As a result, a good point image distribution can be obtained.

In the optical system of the present invention, when the soft focus lens and an optical system with a variable degree of blur have a large image angle, generation of flare which is excellent in symmetry is an important factor. The amount of the spherical aberration generated is also significant. In addition, according to the present invention, a space formed between the positive lens element $L_P$ and the negative lens element $L_N$, i.e., an air lens, is arranged so that a concave surface thereof faces an aperture stop. The purpose of this is to suppress generation of field curvature and asymmetric components of coma aberration when an axial distance D is varied in order to vary spherical aberration. The spherical aberration, including higher-order aberrations are generated by smaller moving amounts of the lens elements.

Various additional conditions or expressions of the present invention will not be described.

In the present invention, it is preferable to satisfy the expression (8):

$$0 < M_A/M_B < 10 \qquad (8)$$

where $M_A$ is the moving amount of the front group $G_A$ for focusing and $M_B$ is the moving amount of the rear group $G_B$ for focusing.

The expression (8) defines an appropriate range of a ratio of the focusing moving amount of the front group GA to that of the rear group $G_B$ in the master lens group $G_M$.

In the present invention, it is preferable that both the front group $G_A$ and the rear group $G_B$ have positive refractive power. Moreover, with respect to aberration correction, it is preferable for a distance between the front lens group $G_A$ and the rear lens group $G_B$. to increase when focusing on an object located at a short distance is conducted. However, other solutions may exist depending on how a balance of the aberration is determined.

When a ratio of $M_A/M_B$ falls below the lower limit of the expression (8), the front group $G_A$ remains stationary during the focusing operation. Also, the optical system adopts a rear focus technique by the rear group $G_B$. In this case, as described before, it is necessary to greatly increase the distance of the space between the front group $G_A$ and the rear group $G_B$ in order to enable the focusing in the macro region to be conducted. This makes focusing in the macro region substantially impossible. Even if the focusing moving amount is decreased by making the refractive power of the focusing element remarkably larger, various types of aberration such as field curvature vary greatly when the focusing operation is conducted when the object is located at a short distance.

When the lower limit of the expression (8) is set to be 0.5, it is possible to realize better-balanced correction of variation in the aberration associated with focusing at a short distance. Furthermore, when the lower limit of the expression (8) is set to be 1.0, the distance of the space between the front group $G_A$ and the rear group $G_B$ is increased associated with the focusing at a short distance. As a result, advantageous effects of the present invention can be fully attained.

When a value of $M_A/M_B$ exceeds the upper limit of the expression (8), the focusing movement amount of the rear group $G_B$ is significantly smaller than that of the front group $G_A$. As a result, the distance between the front group $G_A$ and the rear group $G_B$ is increased excessively during focusing at a short distance. This results in a decrease in the amount of light at the periphery of the screen during the focusing at a short distance. In addition, a satisfactory point image distribution is not obtained in the periphery of the screen and a variation in the aberration associated with the focusing at a short distance is increased. This is also undesirable.

By setting the upper limit of the expression (8) to be 6 or, more preferably 4, the advantageous effects of the present invention can be obtained more satisfactorily.

Moreover, in the present invention, it is desirable to satisfy the following expression (9):

$$0.2 < f_A/f_B < 6 \qquad (9)$$

where $f_A$ is a focal length of the front group $G_A$ and $f_B$ is a focal length of the rear group $G_B$.

The expression (9) defines an appropriate region of a ratio of refractive power of the front group $G_A$ to that of the rear group $G_B$ in the master lens group $G_M$.

In the present invention, the variable aberration optical system was a large image angle and a large aperture. It is desirable to use an optical system having a satisfactorily symmetric optical property in the master lens group $G_A$. Also, in order to realize a superior correction of the aberration and to reduce the size and cost of the optical system, it is desirable to set the ratio of refractive power of the front group $G_A$ and the rear group $G_B$ at an appropriate value. The expression (9) defines the range of the ratio of refractive power so that the central value therein is larger than 1.0 (which is a value obtained when $f_A$ is equal to $f_B$). Here, $f_A > f_B$. This is to make a refractive power arrangement of the entire master lens group $G_M$ be 9 weak telephoto type. In order to balance various types of aberration, such as distortion aberration, and secure a sufficient back focal length, the master lens group $G_M$ should satisfy the range defined by the expression (9).

When a value of $f_A/f_B$ falls below the lower limit of the expression (9), the refractive power of the front group $G_A$ is significantly increased, resulting in an undesirable increase in spherical aberration. In addition, since the back focal length becomes shorter, the moving amount required for obtaining large amount of variation in the aberration during the soft focus operation cannot be secured. Furthermore, a telephoto ratio tends to increase and positive distortion aberration also increases. These are also undesirable. By setting the lower limit of the expression (9) at 0.5 and, preferably 1, the advantageous effects of the present invention can be obtained more satisfactorily.

When a value of $f_A/f_B$ exceeds the upper limit of the expression (9), the refractive power of the rear group $G_B$ is significant. As a result, symmetry of the aberration becomes poorly balanced and the spherical aberration and/or various types of aberration of higher-order increase. This results in degradation of the optical performance in the normal mode which should be provide sharp image quality. Therefore, it becomes impossible to make the aperture and the image angle larger. By setting the upper limit of the expression (9) at 5 and, more preferably, 3, the advantageous effects of the present invention can be attained more satisfactorily.

Furthermore, in the present embodiment of the invention, it is preferable to satisfy the following expression (10):

$$-1 < f_M/f_C < 0 \qquad (10)$$

where $f_M$ is a focal length of the master lens group $G_M$ when focusing is conducted at infinity and $f_C$ is a focal length of the converter lens group $G_C$ in the focusing state when focusing is conducted at infinity and in a lens-position state providing the least amount of spherical aberration. This expression is the same as condition (1) mentioned earlier.

The expression (10) defines an appropriate range of a ratio of the focal length of the master lens group $G_M$ to the focal length $f_C$ of the converter lens group $G_C$.

When the ratio falls below the lower limit of the expression (10) and the focal length $f_M$ of the master lens group $G_M$ is constant, the refractive power of the converter lens group $G_C$ is significant. As a result, in order for the master lens group $G_M$ and converter lens group $G_C$ to have equal focal lengths, it is necessary to make a distance HH' between a principal point on the object-side and a principal point on the image-side larger. Thus, the size of the converter lens group $G_C$ is increased. Also, as a result of the above, the back focal length is extremely short, so that the optical system cannot be incorporated in a single lens reflex camera or the like. By setting the lower limit of the expression (10) to be −0.5 and, more preferably, −0.4, the size of the optical system can be further reduced.

On the other hand, when the ratio of the focal length of the master lens group $G_M$ to that of the converter lens group $G_C$ exceeds the upper limit of the expression (10), the ratio is positive. This means that the converter lens group $G_C$ has positive refractive power. However, such a configuration changes a basic configuration of the present invention, because the present invention uses a lens group having negative refractive power as the converter lens group $G_C$ in order to realize an optical system which has an increased image angle and increased aperture, in which a sufficient amount of the spherical aberration can be obtained both in negative and positive directions, and which has a high-quality position (a lens-position state where sharp image quality can be obtained while various types of aberration are less generated). By making the converter lens group $G_C$ have the negative refractive power, the size of the optical system can be reduced, a sufficient length of the back focal length can be secured, and the various types of aberration can be corrected satisfactorily. Also, when exceeding the upper limit of the expression (10), a telephoto type refractive power arrangement cannot be realized. As a result, not only the size reduction of the optical system becomes difficult, but also the moving amount during the focusing operation tends to undesirably increase. Therefore, this case is undesirable. By setting the upper limit of the expression (10) to be −0.01 and, more preferably −0.12, the advantageous effects of the present invention can be achieved more satisfactorily.

Furthermore, in the present embodiment of the invention, it is desirable to satisfy the following expression (11):

$$0 < f_N/f_C < 1 \qquad (11)$$

where $f_N$ is a focal length of the negative lens element $L_N$. This expression is the same as condition (2) mentioned earlier.

The expression (11) defines an appropriate range of a ratio of the focal length $f_N$ of the negative lens element $L_N$ to the focal length $f_C$ of the converter lens group $G_C$.

In the vicinity of the lower limit of the expression (11), when the refractive power of the converter lens group $G_C$ is constant, the refractive power of the negative lens element $L_N$ is too strong to satisfactorily correct the various types of aberration at a position where sharp image quality is to be obtained, i.e., in a normal mode. Even when satisfactory correction of the various types of aberration is possible, sensitivity to decentering becomes remarkably high, resulting in difficulty in manufacturing the optical system.

When a value of $f_N/f_C$ falls below the lower limit of the expression (11), this value is negative. In other words, either the negative lens element $L_N$ or the converter lens group $G_C$ has positive refractive power. In this case, as described before, the configuration and the technique required for obtaining the advantageous effects of the present invention are not satisfied. Thus, an optical system in which an image angle and aperture can be made larger and a sufficient amount of spherical aberration can be obtained both in negative and positive directions and which has a high-quality position where a high-quality image can be provided cannot be realized. By setting the lower limit of the expression (11) at 0.05 and, more preferably 0.1, the advantageous effects of the present invention can be obtained more satisfactorily.

On the other hand, when a value of $f_N/f_C$ exceeds the upper limit of the expression (11), the refractive power of the negative lens element $L_N$ is too weak to obtain a sufficient amount of variation in the spherical aberration when the refractive power of the converter lens group $G_C$ is constant. Even when a sufficient amount of variation in the spherical aberration is attempted to be obtained by greatly increasing the moving amount of the lens groups, variation in the total length of the optical system becomes large and a position at which the back focal length is significantly short is formed in the variable soft focus mode. This is undesirable. In addition, in the variable soft focus mode providing spherical aberration having a polarity opposite to that of spherical aberration obtained at the above-mentioned position at which the back focal length is short, there arises a mechanical interference between the positive lens element $L_P$ and the negative lens element $L_N$. As a result, a sufficient amount of variation in the spherical aberration cannot be obtained. It is noted that by setting the upper limit of the expression (11) to be 0.6 and, more preferably, 0.4, an even more sufficient amount of variation in the spherical aberration can be obtained.

Furthermore, in the present embodiment of the invention, it is desirable to satisfy the following expression (12):

$$-10 < v_N - v_P < 30 \tag{12}$$

where $v_N$ is Abbe constant of a negative lens in the negative lens element $L_N$, and $v_P$ is Abbe constant of a positive lens in the positive lens element $L_P$. This expression is the same as condition (3) mentioned earlier.

The expression (12) defines an appropriate range of difference between the Abbe constant $v_N$ of the negative lens included in the negative lens element $L_N$ and the Abbe constant $v_P$ of the positive lens included in the positive lens element $L_P$.

The converter lens group $G_C$ is a lens group having negative refractive power which is independent of the master lens group $G_M$. Therefore, considering chromatic aberration in the entire optical system, it is desirable to realize achromatism within the converter lens group $G_C$. More specifically, in the same way as a technique for achromatizing light within a typical negative lens group, it is desirable to make the negative lens an optical material having a small dispersion and the positive lens is made of an optical material having a large dispersion. In the optical system of the present invention, the distance D of the space between the positive lens element $L_P$ and the negative lens element $L_N$ is varied. Thus, if a difference in dispersion between the two lens elements $L_P$ and $L_N$ is set to be too large, then the chromatic aberration varies. For this reason, it is desirable to appropriately set the difference of dispersion between the two lens elements $L_P$ and $L_M$.

When the difference in Abbe constants falls below the lower limit of the expression (12), the dispersion of the negative lens is remarkably larger than that of the positive lens. This is an opposite combination to the combination used for achromatizing in the typical negative lens group. In this case, the variation in the chromatic aberration is increased, resulting in difficulty in obtaining the satisfactory optical performance. It should be noted that, in the optical system of the present invention, the configuration of the master lens group $G_M$ has sufficient freedom for correcting the chromatic aberration. Therefore, the combination of glass materials which is opposite to a combination used for realizing achromatism in the typical negative lens group, i.e., a combination for providing high dispersion in which a positive lens is combined with a negative lens having slightly larger dispersion than that of the positive lens, is also allowed in the optical system of the present invention. In addition, by setting the lower limit of the expression (12) to be $-7$ and, more preferably, $-5$, even better achromatism can be realized. Furthermore, by setting the lower limit of the expression (12) to be $-2.5$, the advantageous effects of the present invention can be attained even more satisfactorily.

When the difference in Abbe constant, exceeds the upper limit of the expression (12), the positive lens has remarkably larger dispersion than that of the negative lens. Therefore, the chromatic aberration is varied along with variation in the distance D of the space between the positive lens element $L_P$ and the negative lens element $L_N$. This is undesirable. Even better achromatism can be realized by setting the upper limit of the expression (12) to be 25 and, more preferably, 15. Furthermore, by setting the upper limit of the expression (12) to be 10, the advantageous effects of the present invention can be attained more satisfactorily.

It is further desirable to satisfy the following expression (13):

$$-1 < (rb - ra)/(rb + ra) < 0 \tag{13}$$

where ra is a radius of curvature of an image-side surface of a positive lens located closest to the image in the positive lens element $L_P$ and rb is a radius of curvature of an object-side surface of a negative lens located closest to the object in the negative lens element $L_N$. This expression is the same as condition (4) mentioned previously.

The expression (13) defines an appropriate range of reciprocal of a shape factor of an air lens formed between the positive lens element $L_P$ and the negative lens element $L_N$.

When a value of $(rb-ra)/(rb+ra)$ falls below the lower limit of the expression (13), the air lens does not have a plano-convex shape with the convex surface facing the image side, but has a double-convex shape. In this case, various types of aberration other than the spherical aberration and, in particular, field curvature or asymmetric coma aberration are largely generated by varying the distance D of the space. This is undesirable. Generation of the various types of aberration other than the spherical aberration and, in particular, the field curvature and the asymmetric coma aberration, can be suppressed more effectively by setting the lower limit of the expression (13) to be $-0.5$ and, more preferably, $-0.2$.

A value of $(rb-ra)/(rb+ra)$ which approaches the upper limit of the expression (13) indicates that the shape of the air lens becomes a meniscus shape in which the convex surface has a remarkably large radius of curvature facing the image-side. As a result, the angles of deviation of the light rays going out from the respective surfaces and light rays entering the respective surfaces become remarkably large and various types of aberration of a higher order are increased.

As a result, the optical performance in a position where sharp image quality is to be obtained (i.e., a normal mode), which is characteristic of the present invention, tends to degrade. Moreover, since a tolerance to decentering, and tolerances of the interval and thickness of the lens becomes significantly strict, manufacturing of the optical system becomes difficult. The advantageous effects of the preset invention can be attained more satisfactorily by setting the upper limit of the expression (13) at −0.005 and, more preferably, −0.01.

Furthermore, in the present embodiment of the invention, it is desirable that the following expression (14) is satisfied:

$$-0.25 < n_N - n_P < 0.35 \tag{14}$$

where $n_N$ is a refractive index for d-ray of the negative lens in the negative lens element $L_N$, and $n_P$ is a refractive index for d-ray of the positive lens in the positive lens element $L_P$. This expression is the same as condition (5) mentioned earlier.

The expression (14) defines an appropriate range of differences between the refractive index $n_N$ for the d-ray of the negative lens in the negative lens element $L_N$ and the refractive index $n_P$ for the d-ray of the positive lens in the positive lens element $L_P$.

When the difference falls below the lower limit of the expression (14), the refractive index of the negative lens element $L_P$ is quite small. As a result, the amount of various types of aberration of higher order is greatly increased. Consequently, the performance at the position where sharp image quality is to be obtained, i.e., in the normal mode, which is characteristic of the present invention, tends to particularly degrade. This is undesirable. Setting the lower limit of the expression (14) to be −0.2 and, more preferably, −0.15, leads to appropriate generation of the spherical aberration, and can satisfactorily suppress the generation of the undesired aberration. The generation field curvature and the asymmetric coma aberration is especially suppressed.

When, however, the difference exceeds the upper limit of the expression (14), the refractive index of the positive lens element $L_P$ is quite small. As a result, it is difficult to set the Petzval sum to be an appropriate value, resulting in increased field curvature.

It is noted that the advantageous effects of the present invention can be attained more sufficiently by setting the upper limit of the expression (14) at 0.25 and, more preferably, 0.2.

Furthermore, in the present embodiment of the invention, it is desirable for the following expression (15) is satisfied:

$$-10 < (rd+rc)/(rd-rc) < 1 \tag{15}$$

where rc is a radius of curvature of an object-side surface of the positive lens element $L_P$, and rd is a radius of curvature of an image-side surface of the positive lens element $L_P$. This expression is the same as condition (6) mentioned earlier.

The expression (15) defines an appropriate range for a shape factor of the positive lens element $L_P$ in the converter lens group $G_C$.

When a value of (rd+rc)/(rd−rc) falls below the lower limit of the expression (15), the positive lens element $L_P$ has a remarkably meniscus shape. As a result, due to effects of higher-order aberration, the optical performances in the position where sharp image quality is to be obtained, i.e., in the normal mode, which is characteristic of the present invention, tends to degrade especially. Therefore, this is undesirable. It is noted that the advantageous effects of the present invention can be attained more sufficiently by setting the lower limit of the expression (15) to be −5.

When a value of (rd+rc)/(rd−rc) exceeds the upper limit of the expression (15), however, the positive lens element $L_P$ has a meniscus shape in which a convex surface faces the object-side. In this case, considerable amount of various types of aberration other than the spherical aberration, in particular, the field curvature and the asymmetric coma aberration are largely generated by varying the distance D of the space. Therefore, this is also undesirable.

It is further desirable to satisfy the following expression (16):

$$-1 < (rf+re)/(rf-re) < 10 \tag{16}$$

where re is a radius of curvature of an object-side surface of the negative lens element $L_N$, and rf is an image-side surface of the negative lens element $L_N$. Expression (16) is the same as condition (7) mentioned earlier.

The expression (16) defines an appropriate range for a shape factor of the negative lens element LN in the converter lens group $G_C$.

When a value of (rf+re)/(rf−re) falls below the lower limit of the expression (16), the shape of the negative lens element $L_N$ is a meniscus shape in which a concave surface faces the image-side, rather than a plano-concave shape in which a concave surface faces the image-side. As a result, the shape of the air lens is greatly different from the meniscus shape. Therefore, considerable amount of various types of aberration other than the spherical aberration, in particular, the field curvature and asymmetric coma aberration are largely generated by varying the distance D of the space. Thus, this is undesirable. It is noted that the advantageous effects of the present invention can be attained more sufficiently by setting the lower limit of the expression (16) to be 0.

However, when a value of (rf+re)/(rf−re) exceeds the upper limit of the expression (16), the shape of the negative lens element $L_N$ is a remarkably meniscus shape. As a result, due to the effects of aberration of higher-order, the optical performances at the position where sharp image quality is to be obtained, i.e., in the normal mode, which is characteristic of the present invention, tends to degrade, especially. Thus, this is also undesirable.

It is noted that even more advantageous effects of the present invention can be attained by setting the upper limit of the expression (16) at 5 and, more preferably, 2 or 1.5.

In addition, in the present invention, it is desirable for the first portion lens group $L_1$ in the master lens group $G_M$ to include two positive lenses in order to obtain satisfactory spherical aberration and coma aberration corresponding to an increased aperture. Moreover, in order to appropriately set the Petzval sum and to realize satisfactory achromatism, it is desirable for the third portion lens group $L_3$ having positive refractive power to include a composite lens of a negative lens and a positive lens, and a positive lens.

Furthermore, in order to reduce the cost and size of the optical system, it is desirable to construct each of the positive lens element $L_P$ and the negative lens element $L_N$ in the converter lens group $G_C$ from a single lens.

Hereinafter, an another embodiment of the present invention will be described with reference to the attached drawings.

FIG. 1 shows a configuration of a variable aberration optical system according to the embodiment of the present invention and tracks of movement of lens elements therein.

The variable aberration optical system as shown in FIG. 1 includes a master lens group $G_M$ having positive refractive power and a converter lens group $G_C$ having negative refractive power in that order from an object. The master lens group $G_M$ includes a first portion lens group $L_1$ having positive refractive power, a second portion lens group $L_2$ having negative refractive power and a third portion lens group $L_3$ having positive refractive power, in that order from the object. On the other hand, the converter lens group $G_C$ includes a lens element $L_P$ having positive refractive power and a lens element $L_N$ having negative refractive power, in that order from the object.

More specifically, the master lens group $G_M$ includes the first portion lens group $L_1$ composed of a double-convex lens and a positive meniscus lens with its convex surface facing the object, the second portion lens group $L_2$ composed of a negative meniscus lens with its convex surface facing the object, an aperture stop S, and the third portion lens group $L_3$ composed of a composite negative lens of a double-concave lens and a double-convex lens, and a double-convex lens. The first portion lens group, the second portion lens group, the aperture stop, the third portion lens group and the double-convex lens are arranged in that order from the object.

The converter lens group $G_C$ is composed of a double-convex lens $L_P$ and a double-concave lens $L_N$ with its concave surface facing the object (the aperture stop S), in that order from the object.

In the present embodiment, a soft focus mode (1) can be realized by moving the negative meniscus lens $L_N$ to increase an axial distance D of the space between the double-convex lens $L_P$ and the double-concave lens $L_N$ with respect to a normal mode in which the amount of spherical aberration generated is the least and sharp image quality is obtained as a standard. Moreover, a soft focus mode (2) can be realized by moving the double-concave lens $L_N$ to decrease the axial distance D of the space. Variation in a back focal length, which is caused by the movement of the double-concave lens $L_N$, can be corrected by moving the master lens group $G_M$ and the double-convex lens $L_P$ integrally with each other.

Furthermore, in the present embodiment, the master lens group $G_M$ is divided into a front group $G_A$ composed of the first and second portion lens groups $L_1$ and $L_2$ which are disposed closer to the object than the aperture stop S, and a rear group $G_B$ composed of the third portion lens group $L_3$ which is disposed closer to the image than the aperture stop S. The front group $G_A$ and the rear group $G_B$ are moved independently of each other (i.e., are made to float) so that a ratio of the focusing moving amount $M_A$ of the front group $G_A$ to the focusing moving amount $M_B$ of the rear group $G_B$, i.e., a moving ratio, satisfies $M_A: M_{B=}1.3: 1$, thereby the focusing on the object located at a short distance can be conducted. Such a focusing technique allows macro photography up to a magnification of ½.

Values for various items in the present embodiment of the invention are listed in the following Table (3). In table (3), f is a focal length in mm, F NO is F-number, $2\omega$ is an image angle, Bf is a back focal length in mm, and D0 is a distance in mm along the optical axis between the object and a surface located closest to the object. Moreover, the surface number indicates the order of the lens surface from the object-side in a direction in which light rays travel, and values for a refractive index and Abbe constant are values for the d-ray ($\lambda$=587.6 nm).

TABLE 3 f = 85
F NO = 2.85
$2\omega$ = 43.5 degrees

| Surface Number | Radius of curvature | Surface interval | Abbe constant | Refractive index |
|---|---|---|---|---|
| 1 | 55.6538 | 5.0000 | 48.04 | 1.716999 |
| 2 | −2603.3146 | 0.1000 | | |
| 3 | 25.1841 | 3.4000 | 53.75 | 1.693500 |
| 4 | 38.3374 | 1.6000 | | |
| 5 | 92.2896 | 1.7000 | 36.98 | 1.612930 |
| 6 | 22.1322 | (d6 = variable) | | |
| 7 | —‡ | 4.0000 | (Aperture stop S) | |
| 8 | −29.3026 | 1.7000 | 32.17 | 1.672700 |
| 9 | 196.5217 | 12.5000 | 53.89 | 1.713000 |
| 10 | −39.9515 | 0.1000 | | |
| 11 | 334.0512 | 3.5000 | 55.60 | 1.696800 |
| 12 | −73.6850 | (d12 = variable) | | |
| 13 | 2514.2791 | 7.0000 | 33.75 | 1.648310 |
| 14 | −49.2645 | (d14 = variable) | | |
| 15 | −45.2184 | 2.0000 | 40.90 | 1.796310 |
| 16 | 1264.3990 | (Bf) | | |

(Distances variable during focusing and soft focusing)

| f&β | 85.02000 | 73.00000 | 90.00000 | −0.03333 | −0.10000 |
|---|---|---|---|---|---|
| D0 | ∞ | ∞ | ∞ | 2604.1136 | 902.5494 |
| d6 | 5.51671 | 5.51671 | 5.51671 | 6.06841 | 7.18198 |
| d12 | 1.96096 | 1.96096 | 1.96096 | 3.80796 | 7.53598 |
| d14 | 2.63421 | 7.07075 | 1.15230 | 2.63421 | 2.63421 |
| Bf | 55.73839 | 39.93660 | 62.24573 | 55.73839 | 55.73839 |

| β | −0.30000 | −0.50000 | −0.10000 | −0.50000 | −0.10000 | −0.50000 |
|---|---|---|---|---|---|---|
| D0 | 333.2842 | 217.3791 | 781.9516 | 192.1951 | 952.1982 | 227.6557 |
| d6 | 10.60870 | 14.17700 | 7.45963 | 15.69403 | 7.08942 | 13.6764 |
| d12 | 19.00804 | 30.95410 | 8.46553 | 36.03287 | 7.22613 | 29.27826 |
| d14 | 2.63421 | 2.63421 | 7.07075 | 7.07075 | 1.15230 | 1.15230 |
| Bf | 55.73840 | 55.73840 | 39.93660 | 39.93661 | 62.24572 | 62.24572 |

(Values corresponding to the expressions)

TABLE 3-continued (1) $f_M/f_C =$ −0.2958
(2) $f_N/f_C =$ −0.2288
(3) $v_N - v_P =$ −7.15
(4) $(r_b - r_a)/(r_b + r_a) =$ −0.0428
(5) $n_N - n_P =$ −0.148
(6) $(r_d + r_c)/(r_d - r_c) =$ −0.9616
(7) $(r_f + r_e)/(r_f - r_e) =$ 0.9309
(8) $M_A/M_B =$ −1.30
(9) $f_A/f_B =$ −1.803

FIGS. 10 through 18 show various types of aberration in the present embodiment.

FIG. 10 shows various types of aberration in a state where the focusing is conducted at infinity and the least amount of the spherical aberration is generated. FIG. 11 shows various types of aberration in the state where the focusing is conducted at infinity in the soft focus mode (1) providing a satisfactory back blur (a background out-focus portion of an image). FIG. 12 shows various types of aberration in the state where the focusing is conducted at infinity in the soft focus mode (2) providing a satisfactory front blur (a foreground out-focus portion of an image).

FIG. 13 shows various types of aberration at a photographic magnification of 1/30 in the normal mode in which the generated amount of the spherical aberration is the least. FIG. 14 shows various types of aberration at a photographic magnification of 1/10 in the normal mode in which the generated amount of the spherical aberration is the least. FIG. 15 shows various types of aberration at a photographic magnification of 1/3.33 in the normal mode in which the generated amount of the spherical aberration is the least. FIG. 16 shows various types of aberration at a photographic magnification of ½ in the normal mode providing the least amount of the spherical aberration. FIG. 17 shows various types of aberration at a photographic magnification 1/10 in the soft focus mode (1) providing a satisfactory back blur. FIG. 18 shows various types of aberration at a photographic magnification of 1/10 in the soft focus mode (2) providing a satisfactory front blur.

In the respective aberration diagrams, F NO denotes F-number, NA denotes numerical aperture, A denotes a half image angle in degrees, H0 denotes an object height in mm during short-distance photographing, d denotes the d-ray (λ=587.6 nm), and g denotes the g-ray (λ=435.8 nm). In addition, in the diagram showing astigmatism, a solid line indicates a sagittal image surface and a broken line indicates a meridional image surface.

Referring to FIG. 10, it can be seen that, in the normal mode, various types of aberration are corrected excellently over a large image angle in the same manner as a typical photographic lens.

Referring to FIG. 11, it is understood that, in the soft focus mode (1), negative spherical aberration and oblique spherical aberration (corresponding to a flare component having symmetry of coma aberration) are generated largely while other types of aberration, in particular, abaxial aberration varies very little. The amount of aberration generated can be continuously controlled between the normal mode and the soft focus mode (1), and defocus image control in which only the degree of the back blur is improved to be satisfactory degree without substantial variation of the performance on the image plane can be realized by moving lens elements from positions in the normal mode toward positions in the soft focus mode (1).

Furthermore, referring to FIG. 12, it can be seen that, in the soft focus mode (2), positive spherical aberration and oblique spherical aberration (corresponding to a flare component having symmetry of coma aberration) are generated largely while other types of aberration, in particular, abaxial aberration varies very little. The amount of aberration generated can be controlled also between the normal mode and the soft focus mode (2), and defocus image control in which only the degree of the front blur is improved to be satisfactory degree without substantial variation of the performance on the image plane can be realized by moving the lens elements from the positions in the normal mode toward the positions in the soft focus mode (2).

Referring to FIGS. 10 and 13 through 16, it can be seen that high optical performance, which is no poorer than that of a typical macro lens, can be obtained over a wide range of image angle in the respective photographing states from a state where the focusing is conducted at infinity to a state of a photographic magnification of ½ in the normal mode.

Referring to FIG. 17, it can be seen that coma aberration has excellent symmetry in a state in which the focusing is conducted at a short distance in the soft focus mode (1).

Referring to FIG. 18, it can be seen that, also in the soft focus mode (2), the coma aberration has excellent symmetry in a state in which focusing is conducted at a short distance.

In the aforementioned embodiment, variation in the back focal length can be compensated for by moving the master lens group $G_M$. and the converter lens group $G_C$ integrally with each other. However, other compensation techniques can be used for compensating for the variation in the back focal length, depending on a manner of the movement of the negative lens element $L_N$ for varying the spherical aberration. According to one technique, the variation in the back focal length can be compensated for only by moving the master lens group $G_M$ or only by the positive meniscus lens $L_P$. As an alternative technique, a compensator lens group may be additionally provided.

Moreover, in the aforementioned embodiment, the moving ratio of the focusing moving amount $M_A$ of the front group $G_A$ to the focusing moving amount $M_B$ of the rear group $G_B$ is set to be constant, i.e., $M_A: M_B=1.3:1$. However, the moving ratio can be appropriately changed depending on the respective photographing states along various movement tracks which are structurally possible, e.g., so-called U-turned tracks. In this way, a more satisfactorily balanced aberration can be obtained.

Furthermore, in the aforementioned embodiment, a solution in which the best-balanced aberration can be obtained when the moving ratio is set to be constant is described. However, a range of the moving amount in which an well-balanced aberration can be obtained is limited. For example, when the moving ratio $M_A: M_B$ falls within a range of 1:1 to 2:1, the well-balanced aberration can be obtained. At this time, if the focusing moving amount at a certain magnification of the respective magnifications satisfies the expression (8), then satisfactory performance can be obtained.

According to the aforementioned embodiment, a variable aberration optical system which has a large image angle of 2ω=43.5 degrees and a large aperture, represented by an F-number of about 2.8 can be realized. Spherical aberration can be continuously varied in a range from a negative value to a positive value including a value corresponding to a state providing sharp image quality. In this variable aberration optical system, a beautiful soft focus image and a beautiful defocus image can be obtained. Photographing can be conducted up to a magnification of ½. In addition, since the aforementioned variable aberration optical system satisfies a condition of large image angle, it can have a function of a so-called tilt shift lens by further moving the entire optical system. A vibration proof optical system can further be realized by moving the master lens group $G_M$, the converter lens group $G_C$, or all of the lens groups in a direction perpendicular to the optical axis thereof.

According to the present invention, a variable aberration optical system which has a sufficiently large image angle, in which spherical aberration can be continuously varied in a range from a negative value to a positive value including a value corresponding to a state providing sharp image quality, and in which focusing can be conducted in a macro region, can be realized.

The particular embodiments described above are only examples and are not to be considered the only embodiments encompassed by the following claims.

I claim:

1. An aberration-controllable optical system comprising:
   a master lens $G_M$ group having a positive refractive power, and
   a converter lens $G_C$ group having a negative refractive power, said master lens group and said converter lens group arranged in order from an object side of the system,
   the master lens group including a first sub lens group L1 with a positive refractive power, a second sub lens group L2 with a negative refractive power, and a third sub lens group L3 with a positive refractive power in order from the object side of the system,
   the converter lens group including a positive lens element $L_P$ with a positive refractive power and a negative lens element LN with a negative refractive power in order from the object side, the positive lens element $L_P$ and the negative lens element $L_N$ forming an air gap therebetween that has a concave surface facing an aperture stop,
   an on-axis air gap distance between the positive lens element and the negative lens element being varied to change mainly spherical aberrations,
   the aberration-controllable optical system satisfying a condition:
   $-1 < f_M/f_C < 0$
   when $f_M$ is a focal length of the master lens group during focusing an infinity object and $f_C$ is a focal length of the converter lens group during focusing an infinity object and at a lens position with minimum spherical aberrations.

2. The aberration-controllable optical system claimed in claim 1, further satisfying a condition:
   $0 < f_N/f_C < 1$
   when $f_N$ is a focal length of the negative lens element $L_N$ and $f_C$ is a focal length of the converter lens group in the afocal state at a position with minimum spherical aberrations.

3. The aberration-controllable optical system claimed in claim 1, further satisfying a condition:
   $-10 < v_N - v_P < 30$
   when vNis the Abbe number of the negative lens element $L_N$ and $v_P$ is the Abbe number of the positive lens element $L_P$.

4. The aberration-controllable optical system claimed in claim 1, further satisfying a condition:
   $-1 < (rb-ra)/(rb+ra) < 0$
   when rb is a radius of curvature of an object side concave surface of the negative lens element $L_N$ and ra is a radius of curvature of an image side surface of the positive lens element $L_P$.

5. The abberration-controllable optical system as claimed in claim 1, further satisfying a condition:
   $0.25 < n_N - n_P < 0.35$
   when $n_N$ is a refractive index of the negative lens element $L_N$ with respect to a d-line (λ=586.6 nm) and $n_P$ is a refractive index of the positive lens element $L_P$ with respect to the d-line (λ=586.6 nm).

6. The aberration-controllable optical system claimed in claim 1, further satisfying a condition:
   $-10 < (rd+rc)/(rd-rc) < 1$
   when rc is a radius of curvature of an object side surface of the positive lens element $L_P$ and rd is a radius of curvature of an image side surface of the positive lens element $L_P$.

7. The aberration-controllable optical system claimed in claim 1, further satisfying a condition:
   $-1 < (rf+re)/(rf-re) < 10$
   when re is a radius of curvature of an object side surface of the negative lens element $L_N$ and rf is a radius of curvature of an image side surface of the negative lens element $L_N$.

8. The aberration-controllable optical system claimed in claim 1, wherein the aberration-controllable optical system is a variable soft focus lens system in which a range of spherical aberrations can be varied from negative values to positive values including a minimum value by changing the on-axis air gap between the positive lens element $L_P$ and the negative lens element $L_N$.

9. The aberration-controllable optical system claimed in claim 1, wherein the first sub lens group $L_1$ consists of two positive lenses, the second sub lens group consists of a negative lens, and the third sub lens group consists of a commented lens, which is composed of a negative lens and a positive lens, and a positive lens.

10. The aberration-controllable optical system claimed in claim 1, wherein the positive lens element $L_P$ consists of a positive lens, and the negative lens element $L_N$ consists of a negative lens.

11. A variable aberration optical system comprising:
    a master lens group $G_M$ having positive refractive power and
    a converter lens group $G_C$ having negative refractive power, the master lens group and the converter lens group being arranged in order from an object,
    wherein the master lens group $G_M$ includes a first portion lens group $L_1$ having positive refractive power, a second portion lens group $L_2$ having negative refractive power and a third portion lens group $L_3$ having positive refractive power and arranged in order from the object,
    wherein the converter lens group includes a positive lens element $L_P$ having positive refractive power and a negative lens element $L_N$ having negative refractive power, a space formed between the positive lens element $L_P$ and the negative lens element $L_N$ is arranged so that a concave surface of the space faces an aperture stop, and an axial distance of the space between the positive lens element $L_P$ and the negative lens element $L_N$ is variable so as to vary mainly spherical aberration, and wherein the master lens group includes a front group $G_A$ and a rear group $G_B$ arranged in order from the object, and the front group $G_A$ and the rear group $G_B$ are moved independently of each other so that focusing on the object located at a short distance is conducted.

12. A variable aberration optical system according to claim 11, wherein a distance of a space between the front group $G_A$ and the rear group $G_B$ increases during the focusing on the object located at a short distance.

13. A variable aberration optical system according to claim 11, wherein a condition:

$0 < M_A/M_B < 10$ is satisfied when MA is a moving amount of the front group $G_A$ for focusing and $M_B$ is a moving amount of the rear group $G_B$ for focusing.

14. A variable aberration optical system according to claim 11, wherein a condition:

$0.2 < f_A/f_B < 6$ is satisfied when fA is a focal length of the front group $G_A$ and $f_B$ is a focal length of the rear group $G_B$.

15. A variable aberration optical system according to claim 11, wherein the master lens group includes an aperture stop, the front group $G_A$ is composed of a lens group located closer to the object than the aperture stop, and the rear group $G_B$ is composed of a lens group located closer to an image than the aperture stop, and wherein a distance of a space between the front group $G_A$ and the rear group $G_B$ increases during focusing on the object located at a short distance.

16. A variable aberration optical system according to claim 11, wherein a condition:

$-1 < f_M/f_C < 0$ is satisfied when $f_M$ is a focal length of the master lens group $G_M$ in a state where focusing is conducted at infinity and $f_C$ is a focal length of the converter lens group $G_C$ in the state where the focusing is conducted at infinity and the least amount of the spherical aberration is generated.

17. A variable aberration optical system according to claim 11, wherein a condition:

$0 < f_N/f_C < 1$ is satisfied when $f_N$ is a focal length of the negative lens element $L_N$ and $f_C$ is a focal length of the converter lens group $G_C$ in a state where focusing is conducted at infinity and the least amount of the spherical aberration is generated.

18. A variable aberration optical system according to claim 11, wherein a condition:

$-10 < v_N - v_P < 30$ is satisfied when $v_N$ is an Abbe constant of a negative lens in the negative lens element $L_N$ and $v_P$ is an Abbe constant of a positive lens in the positive lens element $L_P$.

19. A variable aberration optical system according to claim 11, wherein a condition:

$-1 < (rb-ra)/(rb+ra) < 0$ is satisfied when rb is a radius of curvature of an object-side surface of a negative lens located closest to the object in the negative lens element $L_N$ and ra is a radius of curvature of an image-side surface of a positive lens located closest to the image in the positive lens element $L_P$.

20. The variable abberation optical system according to claim 11, wherein a condition:

$0.25 < n_N - n_P < 0.35$ is satisfyed when $n_N$ is a refractive index for a d-line ($\lambda$=586.6 nm) of a negative lens in the negative lens element $L_N$, and $n_P$ is a refractive index for a d-line ($\lambda$=586.6 nm) of a positive lens in the positive lens element $L_P$.

21. A variable aberration optical system according to claim 11, wherein a condition:

$-10 < (rd+rc)/(rd-rc) < 1$ is satisfied when rc is a radius of curvature of an object-side surface of the positive lens element $L_P$ and rd is a radius of curvature of an image-side surface of the positive lens element $L_P$.

22. A variable aberration optical system according to claim 11, wherein a condition:

$-1 < (rf+re)/(rf-re) < 10$ is satisfied when re is a radius of curvature of an object-side surface of the negative lens element $L_N$ and rf is a radius of curvature of an image-side surface of the negative lens element $L_N$.

23. A variable aberration optical system according to claim 11, wherein the optical system is a variable soft focus lens which is capable of varying the spherical aberration in a range from a negative value to a positive value including a local minimum by varying the axial distance D of the space between the positive lens $L_P$ element and the negative lens element $L_N$.

24. A variable aberration optical system according to claim 11, wherein the first portion lens group $L_1$ includes two positive lenses the second portion lens group includes a negative lens and the third portion lens group includes a composite lens composed of a negative lens and a positive lens, and a positive lens.

25. A variable aberration optical system according to claim 11, wherein each of the positive lens element and the negative lens element is composed of a single lens.

* * * * *